(12) United States Patent
Chou et al.

(10) Patent No.: US 10,834,391 B2
(45) Date of Patent: Nov. 10, 2020

(54) HOLOGRAM STREAMING MACHINE

(71) Applicant: 8i Limited, Wellington (NZ)

(72) Inventors: Philip A. Chou, Culver City, CA (US);
Kieran Thawley, Wellington (NZ);
Robert James William Higgs, Porirua
(NZ); Jounsup Park, Seattle, WA (US)

(73) Assignee: 8i Limited, Wellington (NZ)

( * ) Notice: Subject to any disclaimer, the term of this patent is extended or adjusted under 35 U.S.C. 154(b) by 70 days.

(21) Appl. No.: 15/960,085

(22) Filed: Apr. 23, 2018

(65) Prior Publication Data

US 2019/0327467 A1    Oct. 24, 2019

(51) Int. Cl.
| | |
|---|---|
| *H04N 19/114* | (2014.01) |
| *H04N 19/177* | (2014.01) |
| *G03H 1/22* | (2006.01) |
| *H04N 19/176* | (2014.01) |
| *G03H 1/00* | (2006.01) |
| *H04N 19/94* | (2014.01) |
| *H04N 19/119* | (2014.01) |

(52) U.S. Cl.
CPC ......... *H04N 19/114* (2014.11); *G03H 1/0005* (2013.01); *G03H 1/2249* (2013.01); *H04N 19/176* (2014.11); *H04N 19/177* (2014.11); *H04N 19/94* (2014.11); *G03H 2001/0088* (2013.01); *H04N 19/119* (2014.11)

(58) Field of Classification Search
None
See application file for complete search history.

(56) References Cited

U.S. PATENT DOCUMENTS

| | | | |
|---|---|---|---|
| 7,424,730 B2 | 9/2008 | Chou | |
| 7,536,469 B2 | 5/2009 | Chou et al. | |
| 2010/0158484 A1* | 6/2010 | Casagrande | G11B 27/10 |
| | | | 386/239 |
| 2011/0013884 A1* | 1/2011 | Sasaki | G11B 27/005 |
| | | | 386/248 |

(Continued)

OTHER PUBLICATIONS

"Call for Proposals for Point Cloud Compression V2. ISO/IEC JTC1/SC29/WG11 output document N16763", MPEG 3DG and Requirements Groups, (Apr. 2017), 7 pgs.

(Continued)

*Primary Examiner* — Yi Wang
(74) *Attorney, Agent, or Firm* — Schwegman Lundberg & Lundberg, P.A.

(57) ABSTRACT

Example systems and methods perform streaming of volumetric media and accommodate high user interactivity. A device is configured to access and render streaming holograms and may implement a window as a buffer. In addition, a hologram streaming machine can be configured to stream full or partial holograms in the form of 3D blocks, where different 3D blocks represent a same portion of hologram but may have different resolutions depending on where the user is positioned and looking relative to each 3D block, thus saving network capacity by focusing on what the user is looking at. Since many 3D blocks may be empty much of the time, may be occluded or far away from the user's viewing position, or may be numerous within a 3D space, the device can be configured to request 3D blocks based on their utility, which may be calculated based on bitrate, visibility, or distance.

30 Claims, 9 Drawing Sheets

(56) References Cited

U.S. PATENT DOCUMENTS

2017/0178400 A1* 6/2017 Boulkenafed ........ H04N 19/426
2019/0166410 A1* 5/2019 Kirk ....................... G06T 17/30

OTHER PUBLICATIONS

"International Standard ISO/IEC 23009-1", ISO, Second Edition, (May 15, 2014), 176 pgs.
Akhshabi, Saamer, et al., "An Experimental Evaluation of Rate-Adaptation Algorithms in Adaptive Streaming over HTTP", Proceedings of the second annual ACM conference on Multimedia systems, (2011), 12 pgs.
Alface, Patrice, et al., "Interactive Omnidirectional Video Delivery: A Bandwidth-Effective Approach", Bell Labs Technical Journal 16.4, (2012), 135-147.
Anis, Aamir, et al., "Compression of Dynamic 3D Point Clouds using Subdivisional Meshes and Graph Wavelet Transforms", IEEE Int'l Conf. on Acoustics, Speech, and Signal Processing (ICASSP), (Mar. 2016.), 5 pgs.
Apostolopoulos, J, et al., "The road to immersive communication.", Proc. IEEE 100, 4,, (Apr. 2012), 974-990.
Belshe, M, et al., "Hypertext Transfer Protocol Version 2 (HTTP/2)", IETF RFC 7540, [Online] retrieved from the internet:https://http2.github.io/http2-spec/, (May 30, 2015), 64 pgs.
Boyd, S, et al., "", Convex Optimization, Cambridge University Press, (2004), 730 pgs.
Briceno, Hector, et al., "Geometry Videos: A New Representation for 3D Animations", Symp. Computer Animation 2003, (2003), 136-146.
Chou, Philip, "Advances in immersive communication: (1) Telephone, (2) Television, (3) Teleportation", ACM Trans. Multimedia Comput. Commun., (Oct. 2013), 1-4.
Chou, Philip, et al., "Rate-distortion optimized streaming of packetized media", IEEE Trans. Multimedia, vol. 8, No. 2, (Apr. 2006), 390-404.
Cohen, R A, et al., "Attribute compression for sparse point clouds using graph transforms", IEEE Intl Conf. Image Processing (ICIP), (Sep. 2016), 1374-1378.
Collet, Alvaro, et al., "High-Quality Streamable Free-Viewpoint Video", ACM Trans. Graphics (SIGGRAPH), 34(4), (2015), 13 pgs.
Corbillon, Xavier, et al., "Viewport-Adaptive Navigable 360-Degree Video Delivery", Proc. IEEE Intl Conf. Communications, (2017), 7 pgs.
De Cicco, Luca, et al., "ELASTIC: a Client-side Controller for Dynamic Adaptive Streaming over HTTP (DASH)", Packet Video Workshop (PV), 20th International. IEEE, (2013), 1-8.
De Queiroz, R L, et al., "Compression of 3D Point Clouds Using a Region-Adaptive Hierarchical Transform", IEEE Transactions on Image Processing, vol. 25, No. 8, Aug. 2016, (Aug. 2016), 3947-3956.
Dou, Mingsong, et al., "Fusion4D: Real-time Performance Capture of Challenging Scenes", ACM Trans. Graph., vol. 35, No. 4, Article 114, (Jul. 2016), 1-13.
Fuchs, H, "Office of the Future", [Online]. Retrieved from the Internet: <URL: http://www.cs.unc.edu/Research/stc/index.html>, (accessed Apr. 11, 2018), 2 pgs.
Gabor, D, "A new microscopic principle Nature 161 1948", Nature Publishing Group, vol. 161, (May 15, 1948), 777-778.
Gu, Xianfeng, et al., "Geometry Images", Proceedings of ACM SIGGRAPH 21(3), (2002), 355-361.
Hou, J, et al., "Sparse Representation for Colors of 3D Point Clouds via Virtual Adaptive Sampling", Int'l Conf. on Acoustics, Speech, and Signal Processing (ICASSP), (2017), 2926-2930.
Huang, Cheng, et al., "Optimal Control of Multiple Bit Rates for Streaming Media", Picture Coding Symp.,, (Dec. 2004), 4 pgs.
Huang, Te-Yuan, et al., "Downton Abbey Without the Hiccups: Buffer-Based Rate Adaptation for HTTP Video Streaming", Proceedings of the 2013 ACM SIGCOMM workshop on Future human-centric multimedia networking., (2013), 9-14.
Huang, Y, et al., "A generic scheme for progressive point cloud coding", IEEE Trans. Vis. Comput. Graphics, vol. 14, No. 2, (Mar. 2008), 440-453.
Izadi, Shahram, et al., "KinectFusion: Real-time 3D Reconstruction and Interaction Using a Moving Depth Camera", Proceedings, ACM Symposium on User Interface Software and Technology (UIST '11), Santa Barbara, CA, (Oct. 2011), 559-568.
Jiang, Junchen, et al., "Improving Fairness, Efficiency, and Stability in HTTP-based Adaptive Video Streaming and FESTIVE", Proceedings of the 8th international conference on Emerging networking experiments and technologies., (2012), 97-108.
Kammerl, J, et al., "Real-time compression of point cloud streams", 2012 IEEE International Conference on Robotics and Automation, (May 2012), 778-785.
Li, Zhi, et al., "Probe and Adapt: Rate Adaptation for HTTP Video Streaming at Scale", IEEE Journal on Selected Areas in Communications 32.4, (Apr. 2014), 719-733.
Liang, Yi, et al., "Adaptive Playout Scheduling and Loss Concealment for Voice Communication Over IP Networks", IEEE Transactions on Multimedia, vol. 5, No. 4,., (Dec. 2003), 532-543.
Mekuria, R, et al., "Design, implementation and evaluation of a point cloud codec for tele-immersive video", IEEE Trans. on Circuits and Systems for Video Technology, 27(4), (2017), 828-842.
Nahrstedt, K, et al., "TEEVE: The Next Generation Architecture for Tele-immersive Environments", Proceedings—Seventh IEEE International Symposium on Multimedia, ISM 2005, (2005), 112-119.
Nelson, Dave, et al., "Windows Media Server or Web Server?", [Online]. Retrieved from the Internet: <URL: https://docs.microsoft.com/en-us/iis/media/windows-media-services/windows-media-server-or-web-server>, (May 15, 2008), 10 pgs.
Newcombe, Richard, et al., "DynamicFusion: Reconstruction and Tracking of Non-rigid Scenes in Real-Time", IEEE CVPR, (2015), 343-352.
Nguyen, Ha, et al., "Compression of Human Body Sequences Using Graph Wavelet Filter Banks", IEEE Int'l Conf. on Acoustics, Speech, and Signal Processing, (May 2014), 6152-6156.
Orts-Escolano, S, et al., "Holoportation: Virtual 3D Teleportation in Real-time", ACM UIST, (2016), 741-754.
Pavez, Eduardo, et al., "Dynamic Polygon Cloud Compression", Int'l Conf. on Acoustics, Speech, and Signal Processing (ICASSP), (Mar. 2017).
Queiroz, R L, et al., "Transform Coding for Point Clouds Using a Gaussian Process Model", IEEE Transactions on Image Processing, vol. 26, No. 7, Jul. 2017, (Jul. 2017), 3507-3517.
Rebatta, A, "295 Tbps: Internet Traffic and Capacity in 2017", [Online]. Retrieved from the Internet: <URL: https://blog.telegeography.com/295-tbps-internet-traffic-and-capacity-in-2017>, (Sep. 20, 2017), 6 pgs.
Schnabel, Ruwen, et al., "Octree-based Point-Cloud Compression", Eurographics Symposium on Point-Based Graphics, (Jul. 2006), 111-121.
Spiteri, K, et al., "Bola: Near-Optimal Bitrate Adaptation for Online Videos", IEEE INFOCOM 2016—The 35th Annual IEEE International Conference on Computer Communications, (2016), 9 pgs.
Thanou, D, et al., "Graph-based compression of dynamic 3D point cloud sequences", IEEE Trans. Image Processing, vol. 25, No. 4 (Apr. 2016), 1-14.
Yu, Matt, et al., "Content Adaptive Representations of Omnidirectional Videos for Cinematic Virtual Reality", ACM Multimedia Workshop on Immersive Media Experiences, (2015), 1-6.
Zhang, C, et al., "Point cloud attribute compression with graph transform", IEE International Conference Image Processing, (Oct. 2014), 2066-2070.
Zhang, C, "Viewport: A fully distributed immersive teleconferencing system with infrared dot pattern", IEEE MultiMedia 20, 1., (2013), 17-27.

\* cited by examiner

US 10,834,391 B2

HOLOGRAM STREAMING MACHINE

TECHNICAL FIELD

The subject matter disclosed herein generally relates to the technical field of special-purpose machines that facilitate computer graphics, including software-configured computerized variants of such special-purpose machines and improvements to such variants, and to the technologies by which such special-purpose machines become improved compared to other special-purpose machines that facilitate computer graphics. Specifically, the present disclosure addresses systems and methods to facilitate streaming of volumetric media (e.g., holograms).

BACKGROUND

A machine may be configured to interact with one or more users by providing video streaming services to one or more corresponding user devices. For example, the machine may stream 176×144 (QCIF) video at 15 frames per second (fps), compressed to 40 Kbps, over a 56 Kbps modem to a user device. As another example, the machine may stream 1920× 1080 (HD) video at 30 fps to a broadband user device at 20 Mbps. In addition, new forms of immersive media have recently become available, offering experiences well beyond ordinary two-dimensional (2D) video. Such new forms of immersive media include spherical video for virtual reality (VR), and three-dimensional (3D) volumetric media, popularly known as holograms, for augmented reality (AR) as well as VR. Spherical (e.g., 360° or omnidirectional) video has a number of variants, including simple monoscopic spherical video with two degrees of freedom (DOF), allowing the user to change the azimuth and elevation of the field of view, which may be suitable for web browsers.

BRIEF DESCRIPTION OF THE DRAWINGS

Some embodiments are illustrated by way of example and not limitation in the figures of the accompanying drawings.

DETAILED DESCRIPTION

Figure 1:
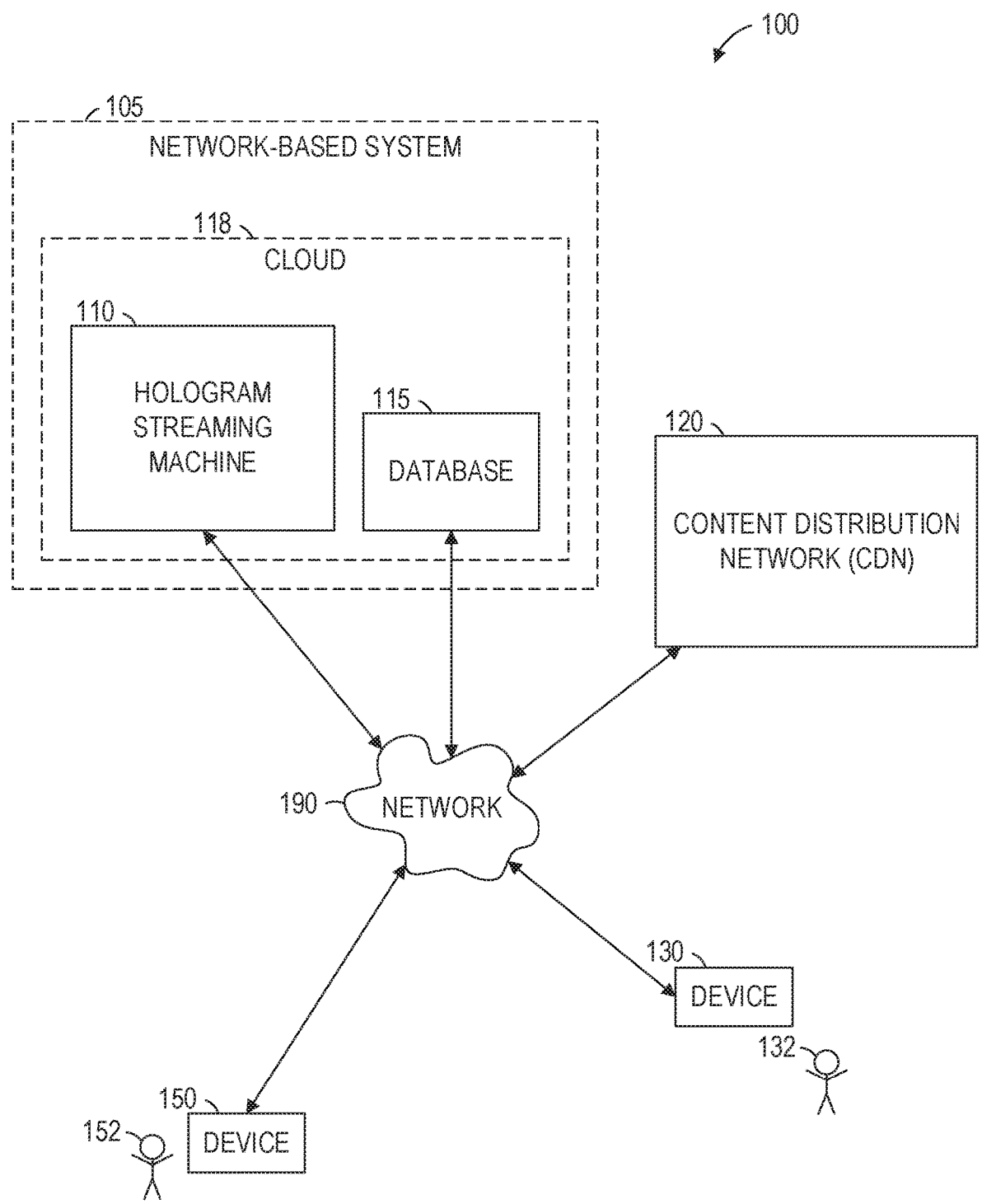
FIG. 1 is a network diagram illustrating a network environment suitable for streaming holograms, according to some example embodiments.

Example methods (e.g., algorithms) facilitate streaming of volumetric media (e.g., holograms), and example systems (e.g., special-purpose machines configured by special-purpose software) are configured to facilitate streaming of volumetric media (e.g., holograms). Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

In streaming volumetric media (e.g., holograms, such as for AR or VR applications), it is helpful to handle high levels of user interaction (e.g., higher than handled in streaming spherical video). Since holograms support full 6DOF (e.g., free-viewpoint), not only may a user turn her head to change her view direction, but she may also navigate freely among a multitude of holograms in a 3D space, changing both her view direction and position in the 3D space, in the process potentially changing her proximity to one or more of various holograms over a wide range of distances, and changing the viewing direction from which she sees the holograms.

The systems and methods described herein are configured to perform streaming of volumetric media (e.g., in AR or VR) to one or more devices, using special approaches to accommodate high levels of user interactivity. An example of such a system includes a specially configured hologram streaming machine (e.g., a hologram streaming server machine) in network communication with a specially configured device (e.g., a client device, a user device, or both). The device is configured to access (e.g., receive) and render streaming holograms and may implement a window as a buffer, in contrast with using a queue as a buffer. By using such a window-based buffer, the system can respond quickly to an unforeseen user action by inserting updated content (e.g., volumetric media content) into the buffer just in time before it is to be rendered (e.g., played back), rather than inserting it at the end of a queue and subjecting the user to large latencies.

In addition, the hologram streaming machine can be further configured to stream full or partial holograms in the form of 3D blocks, which may be considered analogously to 2D tiles of spherical video. Different 3D blocks may represent a same portion of hologram with respect to time, space, or both, but have different resolutions depending on where the user is positioned and looking relative to each 3D block. This approach saves network capacity (e.g., bandwidth or other measure of data rate) by focusing on what the user is looking at. Since many 3D blocks, as regions of 3D space, may be empty a significant part of the time, may be occluded or far away from the user's viewing position, or may be quite numerous within a large 3D space, the device can be additionally configured to request 3D blocks based on their utility (e.g., based on corresponding utility scores), which may be calculated based on factors such as bitrate, visibility, distance from the viewing point of the user, or any suitable combination thereof.

In some example embodiments, the device is configured to detect that a first view of 3D content in a 3D space is to be replaced with a second view of the 3D content in the 3D space. The device accesses a buffer (e.g., a window-based buffer) that stores a first set of 3D blocks that partition the 3D space, collectively enclose at least a first portion of the 3D content, and each have a different combination of presentation time and presentation location in the 3D space. The first set of 3D blocks is requested based on the first view of the 3D content and includes a first 3D block that has a first presentation time. In response to the detection that the second view is to replace the first view, the device selects a second set of 3D blocks that partition the 3D space, collectively enclose at least a second portion of the 3D content, and each have a different combination of presentation time and presentation location in the 3D space. The second set of 3D blocks is selected based on the second view of the 3D content and includes a second 3D block that has a second presentation time prior to the first presentation time of the first 3D block. The device requests and receives the second 3D block from a provider of the 3D content. The received second 3D block is inserted non-sequentially into the buffer that stores the first 3D block. Based on the second presentation time of the second 3D block, the device provides the second 3D block from the buffer to a rendering engine configured to render the second view of the 3D content in the 3D space.

In some example embodiments, the hologram streaming machine is configured to provide a first set of 3D blocks that partition a 3D space, collectively enclose at least a first portion of 3D content in the 3D space, and each have a different combination of presentation time and presentation location in the 3D space. The providing of the first set of 3D blocks is to a client device and in response to at least one first request resultant from selection of the first set of 3D blocks by the client device based on a first view of the 3D content. The first set of 3D blocks includes a first 3D block that has a first presentation time. The hologram streaming machine detects a second request for a second 3D block that has a second presentation time prior to the first presentation time of the first 3D block. The second request is resultant from selection of a second set of 3D blocks by the client device based on a detection by the client device that a second view of the 3D content is to replace the first view of the 3D content. The second set of 3D blocks partitions the 3D space, collectively encloses at least a second portion of the 3D content in the 3D space, and each has a different combination of presentation time and presentation location in the 3D space. The hologram streaming machine provides, in response to the detected second request, the requested second 3D block non-sequentially to the client device after provision of the first 3D block to the client device.

In certain example embodiments, the device is configured to detect that a first view of 3D content in a 3D space is to be replaced with a second view of the 3D content in the 3D space. The device accesses a data structure (e.g., a manifest, an index, or any suitable combination thereof) that correlates a representation of a 3D object included in the 3D content with at least one of a bitrate of the representation, a spatial resolution of the representation, or a temporal resolution of the representation. The data structure further correlates the representation with a 3D block that encloses at least part of the 3D object. In response to the detection that the second view is to replace the first view, the device selects a set of 3D blocks that partition the 3D space, collectively enclose at least a portion of the 3D content, and each have a different combination of presentation time and presentation location in the 3D space. The selecting of the set of 3D blocks is based on the second view of the 3D content and includes: calculating a utility score of the 3D block based on at least one of the bitrate of the representation correlated with the 3D block, the spatial resolution of the representation correlated with the 3D block, or the temporal resolution of the representation correlated with the 3D block; and selecting the 3D block for inclusion in the set of 3D blocks based on its calculated utility score. The device requests and receives the selected 3D block from a provider of the 3D content. The device provides the 3D block to a rendering engine configured to render the second view of the 3D content in the 3D space.

In certain example embodiments, the hologram streaming machine is configured to provide a first set of three-dimensional (3D) blocks that partition a 3D space, collectively enclose at least a first portion of 3D content in the 3D space, and each have a different combination of presentation time and presentation location in the 3D space. The providing of the first set of 3D blocks is to a client device and in response to at least one first request resultant from selection of the first set of 3D blocks by the client device based on a first view of the 3D content. The hologram streaming machine detects a second request for a second 3D block. The second request is resultant from selection of a second set of 3D blocks by the client device based on a detection by the client device that a second view of the 3D content is to replace the first view of the 3D content. The second set of 3D blocks partitions the 3D space, collectively encloses at least a second portion of the 3D content in the 3D space, and each has a different combination of presentation time and presentation location in the 3D space. The second 3D block is selected by the client device based on a corresponding utility score calculated based on at least one of a bitrate of a representation of a 3D object included in the 3D content and correlated with the second 3D block by a data structure, a spatial resolution of the representation, or a temporal resolution of the representation. The hologram streaming machine provides the requested second 3D block to the client device in response to the detected second request. The client device is configured to render the second view of the 3D content in the 3D space. Further details are described below.

FIG. 1 is a network diagram illustrating a network environment 100 suitable for streaming volumetric media (e.g., streaming holograms), according to some example embodiments. The network environment 100 includes a hologram streaming machine 110, a database 115, a content distribution network 120, and devices 130 and 150, all communicatively coupled to each other via a network 190. The hologram streaming machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The hologram streaming machine 110, the database 115, the content distribution network 120, and the devices 130 and 150 may each be implemented in a special-purpose (e.g., specialized) computer system, in whole or in part, as described below with respect to FIG. 9.

As illustrated in FIG. 1, the hologram streaming machine 110 (e.g., with or without the database 115) may be configured as a server machine (e.g., within the cloud 118, which may be configured as a server cloud), and one or more of the devices 130 and 150 may be configured as clients of the server machine. However, the methodologies discussed herein are applicable in alternative network configurations, including peer-to-peer scenarios in which, for example, the device 150 includes components described herein for the hologram streaming machine 110 and performs operations described herein for the hologram streaming machine 110. Accordingly, the device 150 may be configured as a server device, and one or more of the device 130 and the hologram streaming machine 110 may be configured as clients of the server device. Moreover, such alternative network configurations include scenarios in which the content distribution network 120 is included within the database 115, the cloud 118, the network-based system 105, or any suitable combination thereof.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 9, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., among the machine 110, the content distribution network 120, and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
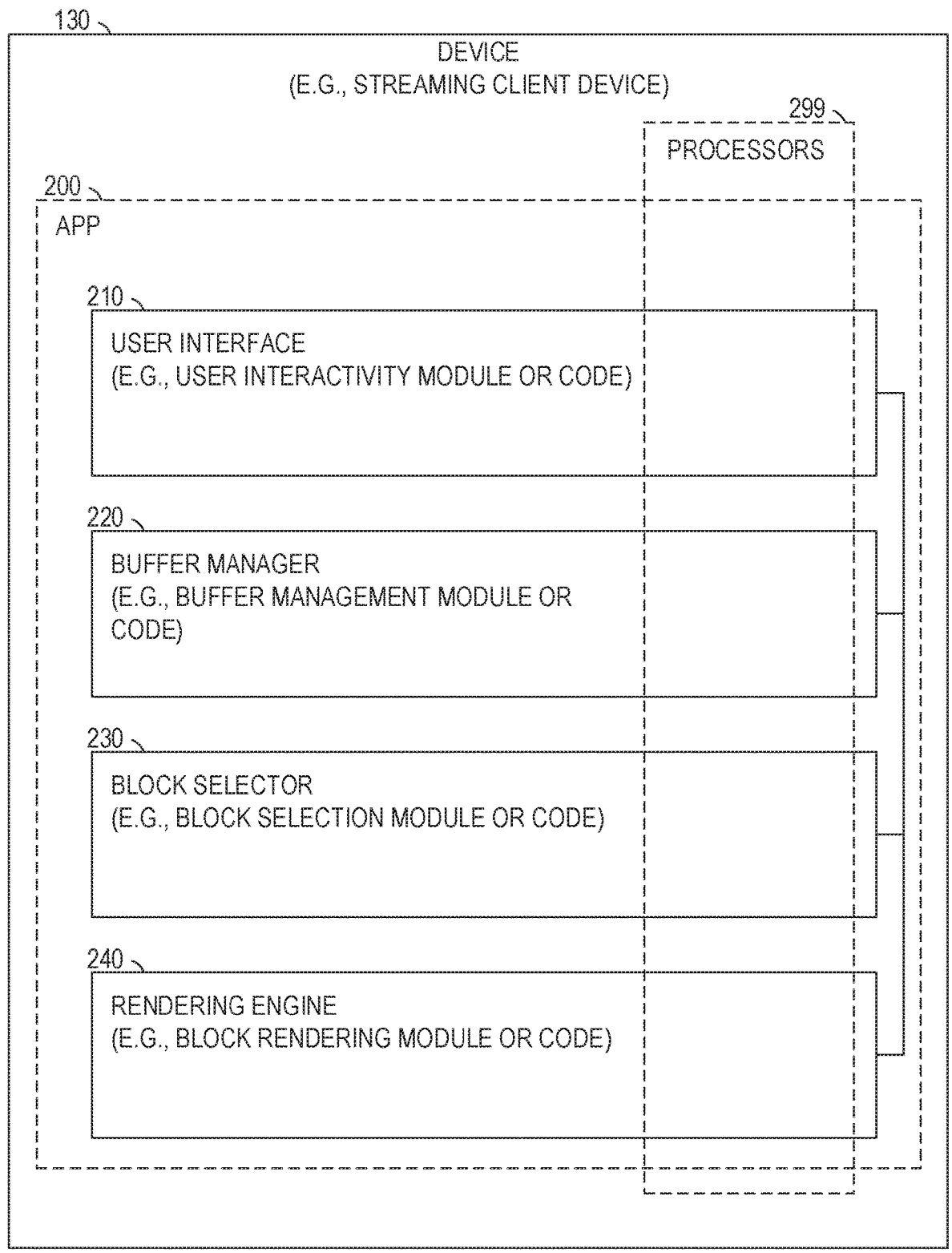
FIG. 2 is a block diagram illustrating components of a device suitable for obtaining and rendering streamed holograms, according to some example embodiments.

FIG. 2 is a block diagram illustrating components of the device 130, as configured for obtaining and rendering streamed holograms, according to some example embodiments. The device 130 is shown as including a user interface 210, a buffer manager 220, a block selector 230, and a rendering engine 240, all configured to communicate with each other (e.g., via a bus, shared memory, or a switch). The user interface 210 may be or include a user interactivity module or similarly suitable code (e.g., configured to interact with the user 132, such as by detecting changes in viewing direction with respect to volumetric media within a 3D space). The buffer manager 220 may be or include a buffer management module or similarly suitable code (e.g., configured to insert 3D blocks into a window-based buffer and provide or delete 3D blocks from the window-based buffer). The block selector 230 may be or include a block selection module or similarly suitable code (e.g., configured to select a set of one or more 3D blocks to be requested from a provider of volumetric media, such as the hologram streaming machine 110). The rendering engine 240 may be or include a block rendering module or similarly suitable code (e.g., configured to obtain one or more 3D blocks from a buffer, such as a window-based buffer, and render the obtained one or more 3D blocks on a display for viewing by the user 132).

As shown in FIG. 2, the user interface 210, the buffer manager 220, the block selector 230, the rendering engine 240, or any suitable combination thereof, may form all or part of an app 200 (e.g., a mobile app) that is stored (e.g., installed) on the device 130 (e.g., responsive to or otherwise as a result of data being received from the network-based system 105 via the network 190). Furthermore, one or more processors 299 (e.g., hardware processors, digital processors, or any suitable combination thereof) may be included (e.g., temporarily or permanently) in the app 200, the user interface 210, the buffer manager 220, the block selector 230, the rendering engine 240, or any suitable combination thereof.

Figure 3:
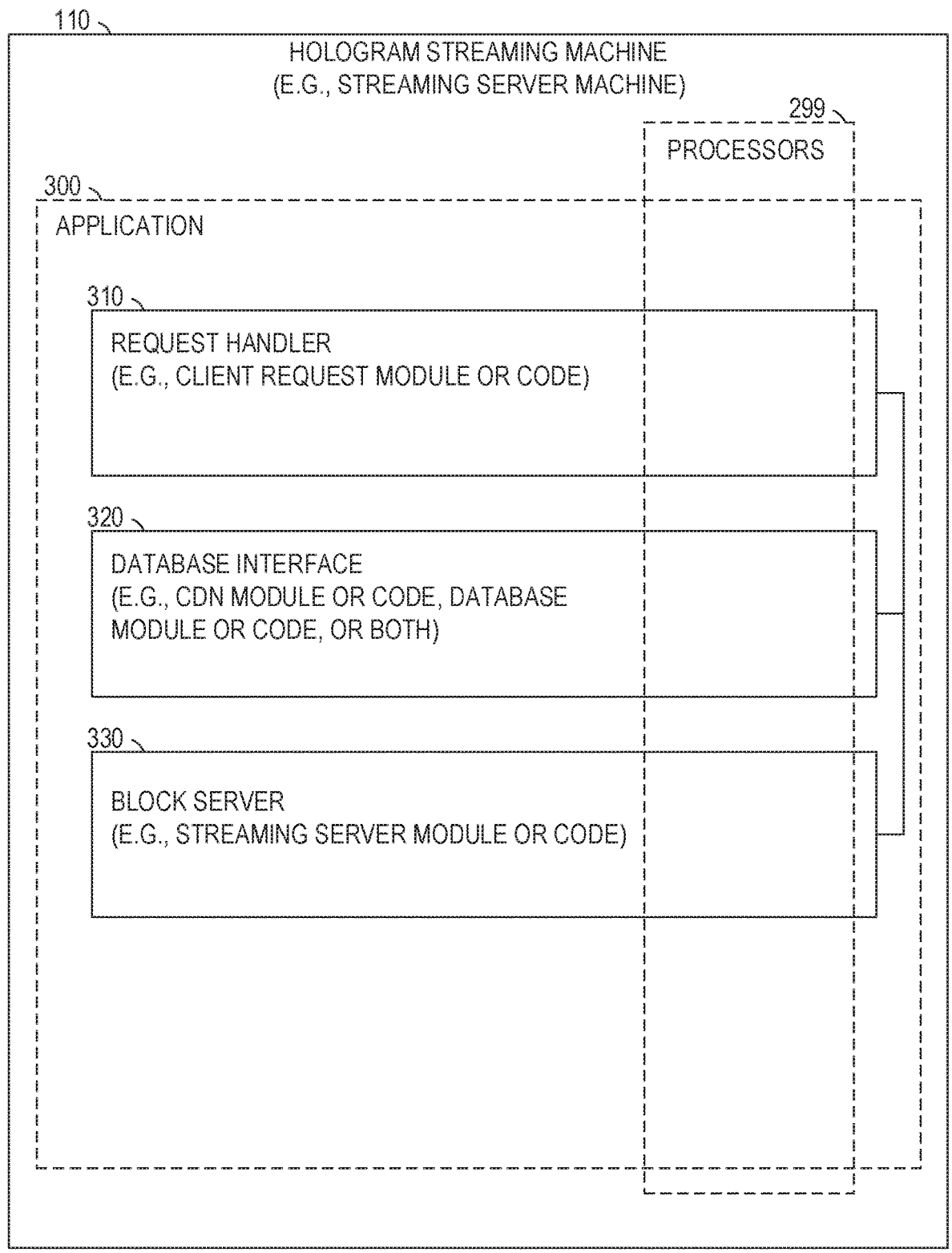
FIG. 3 is a block diagram illustrating components of a hologram streaming machine, according to some example embodiments.

FIG. 3 is a block diagram illustrating components of the hologram streaming machine 110, as configured for streaming holograms, according to some example embodiments. The hologram streaming machine 110 is shown as including a request handler 310, a database interface 320, and a block server 330, all configured to communicate with each other (e.g., via a bus, shared memory, or a switch). The request handler 310 may be or include a client request module or similarly suitable code (e.g., configured to receive and respond to requests from the devices 130 and 150). The database interface 320 may be or include a content distribution network module or similarly suitable code (e.g., configured to interact with the content distribution network 120 or another content distribution network), a database module or similarly suitable code (e.g., configured to interact with the database 115 or another database), or any suitable combination thereof. The block server 330 may be or include a streaming server module or similarly suitable code (e.g., configured to serve or otherwise provide one or more 3D blocks of volumetric content, for example, in response to requests received by the request handler 310).

As shown in FIG. 3, the request handler 310, the database interface 320, the block server 330, or any suitable combination thereof, may form all or part of an application 300 (e.g., a server-side application) that is stored (e.g., installed) on the hologram streaming machine 110 (e.g., responsive to or otherwise as a result of data being received via the network 190). Furthermore, one or more processors 299 (e.g., hardware processors, digital processors, or any suitable combination thereof) may be included (e.g., temporarily or permanently) in the application 300, the request handler 310, the database interface 320, the block server 330, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Returning to FIG. 2, the database interface 320 in the hologram streaming machine 110 stores or causes storage of volumetric media in the form of 3D objects (e.g., holograms) for streaming to one or more of the devices 130 and 150. Each 3D object is represented as a temporal sequence of voxelized point cloud (VPC) frames; the frames are grouped into groups of frames (GOFs); and the sequence of GOFs is divided temporally into segments. Each segment is independently compressed to a small set of representations, with each representation being compressed to a different data size (e.g., file size) for streaming at a correspondingly different bitrate. The bitrates may be constant across all segments. Each GOF is divided spatially into 3D blocks (e.g., 3D tiles) that are independently coded. A media presentation description (MPD), which may be called a "manifest" (e.g., manifest file or other manifest data structure), accompanies each 3D object to describe its corresponding set of representations. A segment index (e.g., an index file or other index data structure) accompanies each segment to index the 3D blocks included within the segment.

Returning to FIG. 3, the buffer manager 220 in the device 130 (e.g., an HTTP client) downloads the manifest for a given 3D object to be rendered, downloads the segment index for each segment, estimates the network capacity (e.g., throughput data rate) available for downloading 3D blocks, estimates the viewing position of the user 132 within the 3D space to be rendered, selects a set of 3D blocks that maximizes utility scores for the estimated network capacity, requests the selected set of 3D blocks, downloads them into a window-based buffer, advances a time window of the buffer, provides 3D blocks whose presentation times fall out of the time window to the rendering engine 240, which decodes, renders, and causes presentation of the provided 3D blocks on a display to the user 132.

Figure 4:
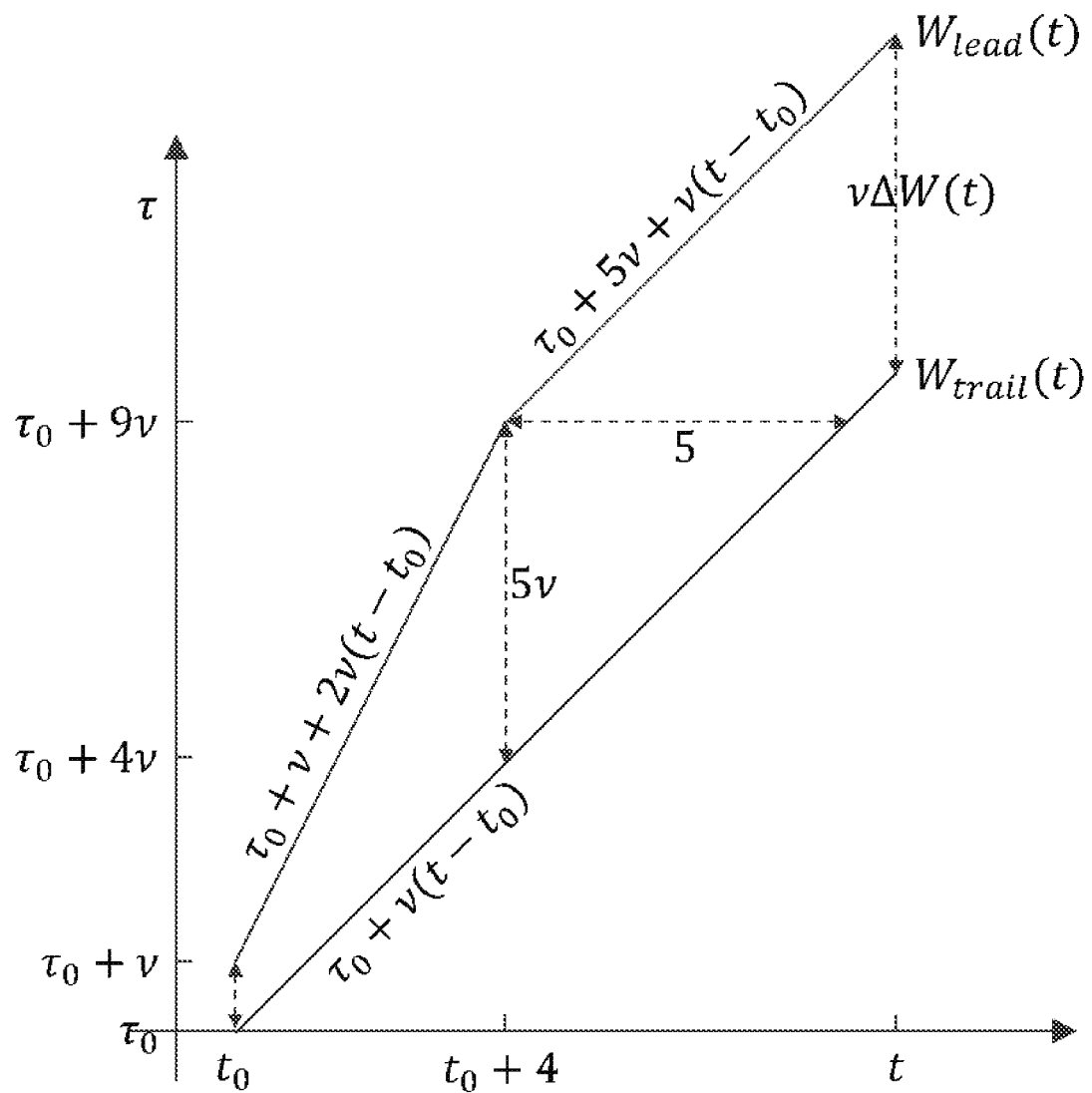
FIG. 4 is a graph illustrating usage of a window-based buffer, according to some example embodiments.

FIG. 4 is a graph illustrating usage of a window-based buffer that may be managed by the buffer manager 220 of the device 130, according to some example embodiments. When a user (e.g., user 132) wearing a head-mounted display turns her head to change the viewing direction in a 3D space, or picks up a 3D object in the 3D space to examine it, a portion of the volumetric content in the 3D space, which until that moment may have been streaming at low resolution, may suddenly benefit from being displayed at high resolution to the user. The same thing can happen with a handheld display, for example, when a 3D object is streamed to a mobile phone, and the user suddenly spins the 3D object around or zooms in to see a portion of the 3D object at higher resolution. A window-based buffer provides technical benefits over a queue-based buffer by eliminating large latencies in response to such user interactivity.

The window-based buffer is treated as a time interval, which may be called a time window or simply a "window," that advances over the media presentation timeline. The leading edge of the window corresponds to the tail of a queue, at which the queue would accept insertion of newly downloaded content, while the trailing edge of the window corresponds to the head of a queue, from which the queue would provide stored content for playback. However, in accordance with the systems and methods described herein, the buffer manager 220 of the device 130 may ask the hologram streaming machine 110 for any GOFs whose presentation times are inside the window, not just GOFs whose presentation times are at the leading edge of the window.

Moreover, the buffer manager 220 of the device 130 may ask for a GOF in the window that has already been transmitted and may be stored in the buffer at a low resolution. For example, the buffer manager 220 may ask for a higher resolution version of a GOF that is about to exit the trailing edge of the window and be played back to the user 132, even if it already exists in the buffer at a lower resolution. In this way, the buffer manager 220 is able to respond with low latency to unexpected user interactions.

FIG. 4 shows the evolution of a window over time. The horizontal axis is user time t, for example, the user's wall clock time. The vertical axis is media time $\tau$, for example, as indicated by presentation times (e.g., the wall clock time at which the content was recorded or is to be presented). FIG. 4 shows two monotonically increasing functions: $W_{trail}(t)$ and $W_{lead}(t)$. At any given user time t, the vertical interval

[$W_{trail}(t)$, $W_{lead}(t)$] between these two functions is the window of content that may be in the window-based buffer at any given user time. As user time t advances, the window moves upward. Content leaving the trailing edge of the window is released from the window-based buffer to the rendering engine 240 for playback. Content entering the leading edge of the window is newly available for the block selector 230 of the device 130 to request from the hologram streaming machine 110.

Specifically, if the user 132 seeks to media time $\tau_0$ and plays the content at speed v beginning at time $t_0$, then at any time $t \geq t_0$ the content at media time $$W_{trail}(t) = \tau_0 + v(t - t_0) \qquad (1)$$

is released from the window-based buffer as it leaves the trailing edge of the window, so that it can be decoded and played back to the user. At the same time t, the buffer managed 220 may fetch content as far ahead as media time $$W_{lead}(t) = W_{trail}(t) + v\Delta W(t - t_0), \qquad (2)$$

where $\Delta W(t)$ is a window size function. The window size function is the number of seconds of user time in the window-based buffer. The window size function illustrated in FIG. 4 is $$\Delta W(t) = \begin{cases} 1 + t & 0 \leq t \leq 4 \\ 5 & 4 \leq t \end{cases}. \qquad (3)$$

For this function, the window size grows from 1 to 5 seconds over the first 4 seconds of playback time, then remains at 5 seconds. Thus, the window size starts small to allow playback to begin quickly, but soon grows to allow playback to be robust to network dropouts. Other functions besides Equation (1) are also possible, such as the logarithmic function $\alpha + \beta \log(t)$.

In streaming holograms, unlike streaming video or even streaming spherical video, it may be common to stream multiple 3D objects simultaneously. Each 3D object depicts a single performance, such as a single person performing a single pose. In general, multiple 3D objects are streamed together and composited at the device 130 (e.g., as a client device). The device 130 may be configured to composite the streamed 3D objects by spatio-temporal transformations, and the 3D objects may be streamed from one or more different web servers (e.g., the hologram streaming machine 110, the database 115, or the content distribution network 120).

According to the systems and methods discussed herein, each of the 3D objects that play back simultaneously may have a different seek time $\tau_0$ and playback speed v. However, all such 3D objects may be assumed to begin playback at a common user time $t_0$ and have a common window function $\Delta W(t)$. Thus, the windows onto each object may have different media times (e.g., presentation times), but they coincide in user time (e.g., real time).

Figure 5:
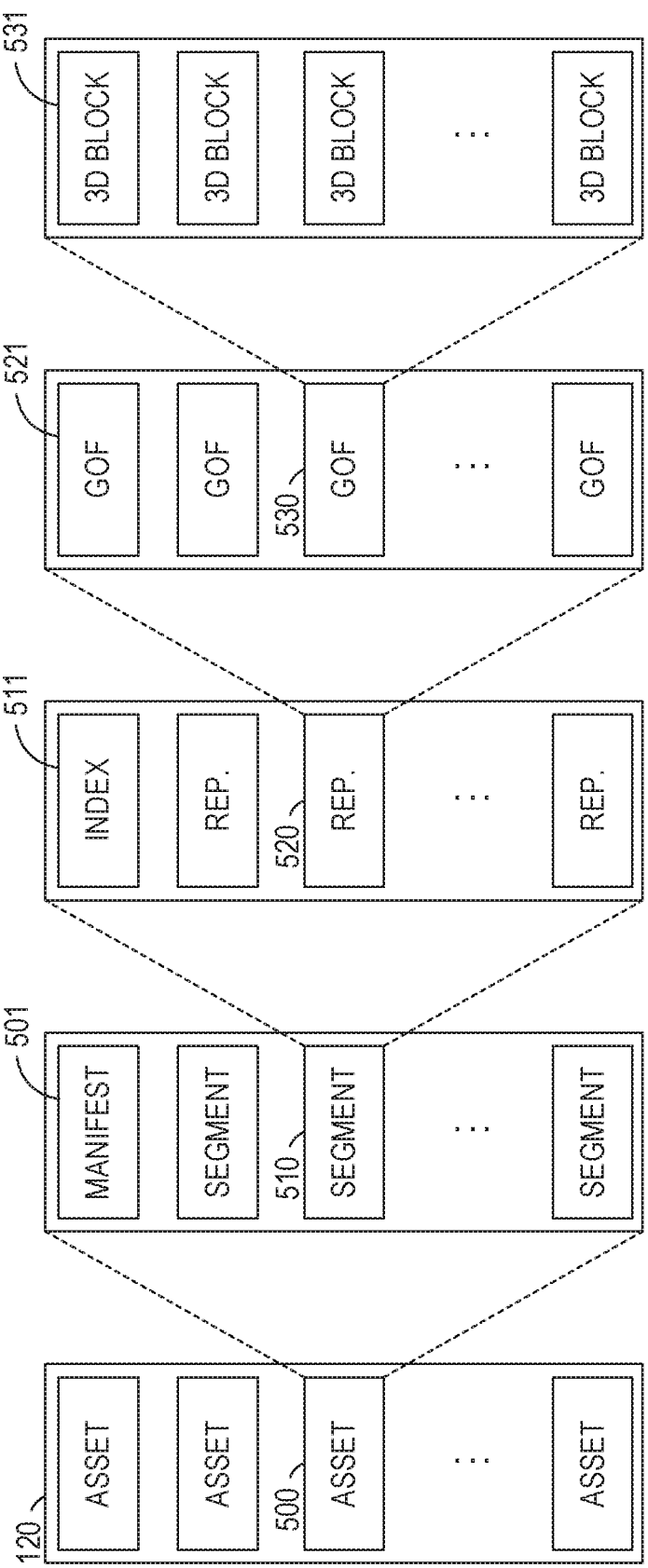
FIG. 5 is a block diagram illustrating relationships among data structures used in streaming holograms, according to some example embodiments.

FIG. 5 is a block diagram illustrating relationships among data structures used in streaming holograms, according to some example embodiments. Such data structures may be stored by the hologram streaming machine 110, the database 115, the content distribution network 120, or any suitable combination thereof.

FIG. 5 depicts the structure and relationships among various files, which may be made available for streaming by the hologram streaming machine 110. Although FIG. 5 shows the content distribution network 120 storing these various files, the illustrated structure and relationships may be present elsewhere, including within the hologram streaming machine 110, the database 115, or the device 130.

Specifically, FIG. 5 illustrates three types of files: manifests, segments, and segment indices. A "manifest" (e.g., manifest 501) corresponds to an asset (e.g., asset 500, which may be a single 3D object) and contains the metadata for that asset by including a list of all the other files for the asset and indicates their properties. A "segment" (e.g., segment 510) contains the volumetric data of the asset (e.g., the asset 500) and is a temporal partition of that asset into time intervals (e.g., of equal duration). Each segment (e.g., the segment 510) may be available in one or more representations, and a "representation" (e.g., representation 520) of a segment differs from other representations of that segment in visual quality, such as spatial resolution, temporal resolutions, or both. An "index" (e.g., the index 511) accompanies each segment (e.g., the segment 510) and indexes the representations (e.g., the representation 520), GOFs (e.g., GOFs 521 and 530), and 3D blocks (e.g., 3D block 531) of that segment.

In some example embodiments, manifests (e.g., the manifest 501), indices (e.g., the index 511), and representations (e.g., the representation 520) are stored as individual files in a file system (e.g., within the hologram streaming machine 110, the database 115, the content distribution network 120, or any suitable combination thereof). These file types are presently described in further detail.

The manifest (e.g., the manifest 501) corresponding to a 3D object specifies, defines, or otherwise indicates the 3D object's properties, a list of its representations, and a schema or template for correlating (e.g., mapping or otherwise assigning) a desired time segment and a desired representation to an address of the 3D block (e.g., a uniform resource locator (URL), for example:

Type (static=on demand, dynamic=live)
ProgramInformation
  title
Period [periodCount]
  duration
  AdaptationSet[adaptationSetCount]
  maxwidth
  maxFrameRate
  cubeToObjectScale
  cubeToObjectRotation
  cubeToObjectTranslation
  tileWidth
  startTime
  mimeType
  codecs
  SegmentTemplate
    timescale
    duration
    media
    startNumber
  Representation [representationCount]
    id
    bandwidth
    width
    frameRate In this example of the manifest (e.g., manifest 501), Period contains all content within a certain duration. There may be multiple instances of Period.

Continuing the above example of the manifest (e.g., the manifest 501), AdaptationSet contains content that can be selected by the user 132 or programmatically by the block selector 230 of the device 130 to be played during the period.

In the context of volumetric media, each AdaptationSet contains a single dynamic 3D object or its audio track. An AdaptationSet is either selected or not selected in its entirety. If the AdaptationSet is a hologram, maxwidth is the width of the bounding cube of the hologram in voxels; maxFrameRate is the maximum frame rate of the hologram; cubeToObject is the transformation from the bounding cube coordinate system into the object's coordinate system; tileWidth is the width of each tile in voxels (relative to maxwidth); startTime is the media start time ($\tau_0$) within the period; mimeType is a MIME type/subtype such as holo/hvr; and codecs is the name of the codec. SegmentTemplate is the template for all the segments in the AdaptationSet. Duration is the length of each segment (in timescale units). Media is the template in a text format, such as: ObjectName_$bandwidth$_$width-$_$framerate$_$number$.hvr Further continuing the above example of the manifest (e.g., manifest 501), StartNumber is the $number$ of the first segment (e.g., 0). $bandwidth$, $width$, and $Sframerate$ indicate the representation used. Representation contains information about the representations available for the AdaptationSet. The information includes id (a text description), bandwidth, width (e.g., the number of voxels across the bounding cube, in this representation), and framerate to indicate the bandwidth and level of detail (LOD) of the representation.

The segment ObjectName_$bandwidth$_$width-$_$framerate$_$number$.hvr (e.g., segment 510) is the chunk of the media file containing an encoding of the 3D object from time ($number$−startnumber)*duration up to but not including time ($number$−startnumber+1)*duration, in the representation with the given $bandwidth$, $width$, and $Sframerate$. An initial segment can also be specified.

A segment (e.g., the segment 510) includes a sequence of GOFs (e.g., the GOF 521). Each GOF consists of an optional GOF header followed by a sequence of 3D blocks (e.g., the 3D block 531). 3D blocks that contain volumetric content are said to be occupied. Only occupied 3D blocks appear in each GOF. The 3D blocks may appear in Morton order, and may be indexed by their Morton codes. The Morton code of a 3D block is the interleaving of the bits for the coefficients of the 3D block's position x, y, and z in the bounding cube coordinate system.

For each segment (e.g., the segment 510), there is one index (e.g., the index 511), which is an index into its associated segment and all of its representations (e.g., the representation 520). The index is used by the device 130 to identify particular representations for particular 3D blocks in particular GOFs in the segment. It is therefore helpful if the index is compact, and also helpful if the index is a binary file (e.g., similar to the segment itself). If a segment (e.g., the segment 510) is stored in a file ObjectName_$bandwidth-$_$width$_$framerate$_$number$.hvr then the corresponding index (e.g., the index 511) can be stored in an associated file ObjectName_$number$.idx or in another file designated by a predetermined filename extension.

The index (e.g., the index 511) contains pointers to the GOFs (e.g., the GOF 521) and to the 3D blocks (e.g., the 3D block 531) of the segment (e.g., the segment 510), so that the 3D blocks for each GOF can be downloaded independently as desired. The information in the index includes, for example:
gofCount
Gof[gofCount]
   startTime
   duration
   frameCount
   tileCount
   Tile [tileCount]
     mortonCode
     normalCode
     Representation[representationCount]
       gofByteOffsetInSegment
       gofHeaderByteCount
       Tile [tileCount]
          byteCount In this example, StartTime is the start time of the GOF; and duration is its duration. FrameCount is the number of frames in the GOF. TileCount is the number of tiles in the GOF. MortonCode is the Morton code for a 3D block. NormalCode is a code for the dominant normal direction of the 3D block. Both position and normal direction may be used to test whether a 3D block is visible or occluded. For each representation of the segment, GofByte OffsetInSegment is the byte offset of the GOF in the file for its segment and representation; GofHeaderByteCount is its size; and Tile[n].byteCount is the size of the nth 3D block. All representations (e.g., the representation 520) for a segment (e.g., the segment 510) may have the same GOF structure, the same 3D block structure, or both. In some example embodiments, only byte offsets and counts are different across the index files for different representations of the same segment.

If visibility testing is not to be performed, it is sufficient to use only a single 3D block (e.g., having Morton code 0). If visibility testing is to be performed, there may be hundreds of 3D blocks per GOF, depending on the granularity of the visibility testing. Even with a hundred 3D blocks, four representations, 32 bits per mortonCode and byteoffset, and GOF size of 4 frames, the bitrate for downloading the index may be at most only about 100*(32+4*32)*30/4=120 Kbps, which is about 1% of a typical total streaming bitrate available to the device 130. However, it may be helpful to have many frames per GOF, few 3D blocks per GOF, and few representations to keep the bitrate for indices as low as possible. Alternatively, the device 130 can be configured to fetch only the relevant parts of the index (e.g., for low-bitrate representations).

When nearby 3D blocks are accessed, they can be grouped together into a single byte range, as part of a multi-part byte range request for the 3D blocks in the segment. This can be made more efficient by having the 3D blocks in Morton order.

According to various example embodiments, the buffer manager 220 in the device 130 has two interfaces: one server-side interface to the hologram streaming machine 110, the database 115, or the content distribution network 120; and one client-side interface to the rendering engine 240 of the device 130.

The server-side interface may operate solely through HTTP requests (e.g., HTTP/2), which allows the device 130 to communicate with the hologram streaming machine 110, the database 115, or the content distribution network 120 in a binary format to create multiple streams that can be prioritized for dependencies between or among the multiple streams, all over a single connection.

The client-side interface may be configured to operate as in the following manner. The rendering engine 240 provides the buffer manager 220 with URLs of the manifests of the 3D objects to be rendered, the seek time, the playback speed, and whether to loop or not. The rendering engine 240 also provides one or more initial viewing positions (e.g., user points of view), which may be expressed in world coordinates (e.g., 3D user position, azimuth, elevation, and horizontal field of view (FOV)). Then, the rendering engine 240 provides some device resolution information, such as pixels across the horizontal FOV. The latter may be used to evaluate the utility of different levels of detail.

The buffer manager 220 accesses (e.g., downloads and opens) the requested manifests, downloads the initial segment and the segment index of the first segment of each representation of each 3D object, downloads the lowest bitrate representation of the 3D objects for a default period of media time (e.g., v seconds), places the received representations in the window-based buffer, and notifies the rendering engine 240 that at least v seconds of content is in the window-based buffer so that the rendering engine 240 can begin playback.

The rendering engine 240 notifies the buffer manager 220 every time the rendering engine 240 obtains one or more 3D blocks from the window-based buffer. In response, the buffer manager 220 updates the head of the window-based buffer (e.g., by advancing the window in time).

The rendering engine 240 may also notify (e.g., via one or more indicators or other signals) the buffer manager 220 of any change in the user's viewing frustum or viewing frusta, which may occur any time the user 132 updates his or her viewing position or viewing direction relative to the 3D objects in the 3D space.

The buffer manager 220 may continue to download requested 3D blocks into the window-based buffer, and the buffer manager 220 may notify the rendering engine 240 of any significant change to the window-based buffer. For example, if the rendering engine 240 attempts to access the window-based buffer but the window-based buffer is empty, then the window-based buffer underflows. The buffer manager 220 may accordingly notify the rendering engine 240 when there is once again v seconds of content in the window-based buffer to restart playback.

According to the systems and methods discussed herein, the window-based buffer is a data structure that mirrors the structure discussed above with respect to FIG. 5. There is an array of 3D objects, each similar to the asset 500. Each 3D object contains information from its corresponding manifest (e.g., manifest 501), as well as an array of segments (e.g., the segment 510). Each segment contains an array of GOFs (e.g., the GOF 521). Each GOF contains an array of 3D blocks, which may be occupied 3D blocks. Thus, in such a data structure, a 3D block is not only a spatial element of a GOF, but also a temporal element of the GOF, and is furthermore associated with a 3D object. Each 3D block (e.g., the 3D block 531) contains the utility[m] and bitCount[m] for each representation m=1, . . . , M of the 3D block, and the selected representation n of the 3D block. The initial representation n is set to 0, meaning that the 3D block initially has no representation, and by convention utility[0]=bitCount[0]=0. Once the representation (e.g., the representation 520) for a 3D block is actually fetched, then the 3D block also contains the fetched data. The buffer manager 220 may request a newer or better (e.g., higher in visual quality) representation for a 3D block at any time, in which case the previously stored representation of the 3D block is overwritten within the window-based buffer.

The representation (e.g., the representation 520) of a 3D block at the current playback time is fed to the rendering engine 240 to decode and render. In some example embodiments, the rendering engine 240 is configured to loop playback, in which case the buffer manager 220 may continue to upgrade the representations (e.g., to representations of higher spatial resolution, higher temporal resolution, or both) on every subsequent pass until there are no more upgrades possible.

The processing thread for the buffer manager 220 may begin when the buffer manager 220 is notified by the rendering engine 240 to begin playback. At that point, the buffer manager 220 downloads the manifests of the 3D objects specified by the rendering engine 240, determines the initial segments of those 3D objects, downloads the indices (e.g., the index 511) for those initial segments, determines the GOFs (e.g., the GOF 521) to be rendered in the first v seconds of each 3D object, requests the lowest bitrate representation for all the 3D blocks in those GOFs from an appropriate server (e.g., hologram streaming machine 110), and waits to receive the requested 3D blocks (e.g., from that server or from a data source managed by that server). When the 3D blocks are received and stored in the window-based buffer, the start time $t_0$ is declared, and the buffer manager 220 notifies the rendering engine 240 to begin playback. From that point on, the window-based buffer at time $t \geq t_0$ stores the set of all 3D blocks for which data has been received (e.g., in all GOFs in all segments in all 3D objects) and whose media times (e.g., presentation time) are within the window of the window-based buffer at time t. Furthermore, from that point on, the rendering engine 240 (e.g., on its own processing thread) extracts data from the buffer at the trailing edge of the window, decodes it, and renders it for presentation.

Beginning at time $t_0$, the buffer manager 220 may enter a request-wait cycle, with the buffer manager 220 requesting data from the server (e.g., the hologram streaming machine 110 or the content distribution network 120) at each request opportunity $t_i$, i=0, 1, 2, . . . , and between requests, waiting for the requested data to be provided. At each request, the buffer manager 220 requests just enough data so that the expected length of time for the data to be transmitted from the server to the device 130 (e.g., the "on" part of the cycle) is T seconds. T may be chosen large enough so that the length of time for the request to reach the server (e.g., the "off" part of the cycle) is a negligible fraction of the cycle, so that that the downlink bandwidth is nearly fully utilized. At the same time, T may be chosen small enough so that the device 130 can quickly adapt to unexpected changes in the network 190 or in behavior the user 132. As an example value, T=0.5 seconds works well.

From the perspective of the buffer manager 220, all action happens at request opportunities. Between request opportunities, the buffer manager 220 may simply wait. At request opportunity $t_i$, the buffer manager 220 first estimates the network capacity (e.g., network throughput) $C_i$ by smoothing the instantaneous estimate $\hat{C}_i = R_{i-1}/(t_i - t_{i-1})$, where $R_{i-1}$ is the number of bits requested at the previous request opportunity. One way to smooth the instantaneous throughput estimates is with a first-order autoregressive filter, $C_i = wC_{i-1} + (1-w)\tilde{C}_i$, for some weight, depending on the memory of the network 190. As an example value, w=0.75 works well and gives a bit budget of $R_i = C_i T$ for the current request.

Given the bit budget $R_i$ for the request, which 3D blocks within the window to request may be selected by the block selector 230 of the device 130, and such selection of 3D blocks may be based on maximizing an expected "utility" to the user (e.g., as measured by utility scores of the 3D blocks), subject to the bit budget. Specifically, if W is the list of 3D blocks in the window, $\mathcal{N}$ ={tile. n} is the list of current representations that correspond to the 3D blocks in W, and $\mathcal{M}$ ={tile.m} list of representations that correspond to the 3D blocks in W after the request is fulfilled, the buffer manager 220 chooses $\mathcal{M}$ to maximize the total utility $$U(\mathcal{M}) = \sum_{tile \in W} tile \cdot utility[tile \cdot m] \qquad (4)$$

subject to the constraint $$R(\mathcal{M}) = \sum_{\substack{tile \in W \text{ and} \\ tile \cdot m \ne tile \cdot n}} tile \cdot bit[tile \cdot m] \le R_i. \qquad (5)$$

The latter sum is only over 3D blocks in the window whose future representations tile.m differ from the current representation tile.n, since only then will the representation tile.m be requested from the server, and its size in bits will only then count towards the bit budget. A request for a new representation is made by the buffer manager 220, if possible, by combining the requests for all 3D blocks in the same segment with that representation into one multipart byte range request.

At every request opportunity, the trailing edge of the window (i.e., the current playback time) advances by some amount (e.g., the time that has elapsed since the last request opportunity), and the leading edge of the window also advances by the same amount or a greater amount (e.g., at the beginning of playback, when the window size is still growing). Most of the requested 3D blocks will fall into the part of the window that is newly opened. However, 3D blocks may still be requested in other parts of the window, for example, if there is a surge of available network throughput, or if the viewing position of the user 132 moves and causes new 3D blocks to become visible in the 3D space. The buffer manager 220 is configured to request and obtain these newly visible 3D blocks within T seconds, as it is not restricted to requesting 3D blocks only at the leading edge of the window.

The utility of a 3D block is a function of, inter alia, the user's viewing position and viewing direction (e.g., viewing frustum), which are passed from the rendering engine 240 to the buffer manager 220 and are kept updated as the user 132 experiences the 3D space and moves about the 3D space. If the user 132 suddenly changes viewing direction (e.g., by moving her head or her head-mounted display), the utility of some 3D blocks may increase, causing them to get higher priority and hence causing the buffer manager 220 to request 3D blocks with the same presentation location and presentation time but contained in a representation with a higher visual quality (e.g., higher spatial resolution, higher temporal resolution, or both).

The utility of a 3D block (e.g., the 3D block 531, whose utility may be indicated by a utility score of the 3D block 531) depends on how much useful information the 3D block brings to the user 132. This depends in turn on the relationship of the 3D block to the viewpoint (e.g., viewing location, viewing direction, or both) of the user 132. If a 3D block is outside the viewing frustum of the user 132, then it has no utility (e.g., a utility score of zero). If it is far away, then its utility may be low, because it covers a small area. On the other hand, as the 3D block moves quite close to the viewing position of the user 132, then its utility may saturate, because its spatial resolution is intrinsically finite. In addition, a 3D block coded with a higher bitrate will generally have a higher spatial resolution, a higher peak signal-to-noise ratio (PSNR), or both. With respect to media time (e.g., presentation time), the utility of a 3D block in the far future is uncertain, because the viewpoint of the user 132 in the future is uncertain. Hence, in principle, one can evaluate only the expected utility of a future 3D block. To complicate matters, frequently there are multiple points of view, for example, in stereoscopic systems and possibly in multi-user systems.

The utility score (e.g., quantifying or otherwise representing actual or expected utility) of a 3D block (e.g., the 3D block 531) is a function of the bitrate of the representation that corresponds to the 3D block (e.g., the representation that includes that 3D block), weighted by the number of distinguishable voxels in the 3D block, by the probability that the 3D block will be visible (e.g., present in the viewing frustum as well as facing the user 132) when the 3D block is decoded and rendered.

To be more specific, for a given 3D block k (e.g., the 3D block 531), corresponding to representation $n_k$ (e.g., the representation 520), and viewpoints $v \in V$ the utility score $U_k(n_k)$ of the 3D block may be given by $$U_k(n_k) = u(B_{n_k}) \times \max_{v \in V} \{LOD_k(n_k, v) \times P_k(v)\}, \qquad (6)$$

where u(B) is a function indicating the utility per distinguishable voxel of the 3D block as a function of the bitrate (e.g., bandwidth) of the representation; $LOD_k(n_k, v)$ is the number of distinguishable voxels of the 3D block if the 3D block is visible from the current viewing position (e.g., viewpoint) v; and $P_k(v)$ is the probability that the 3D block would be visible when rendered, if the current viewing position is v. The latter two factors depend on the spatial resolution of the representation, the size of the 3D block, the point of view relative to the 3D block, and the resolution of the viewing device (e.g., the device 130). However, in some example embodiments, the only parameter that the buffer manager 220 can control to maximize the utility score is $n_k$. According to various example embodiments, any one or more of these three factors are used to calculate the utility score of a 3D block. All three factors are described in detail next.

The first factor, the utility of a 3D block (e.g., the 3D block 531) per distinguishable voxel, can be modeled as an increasing function of the bitrate (e.g., bandwidth) of the 3D block's corresponding representation, using the bitrate as a proxy for the visual quality of the representation. Though the utility of visual quality to any given user may be difficult to specifically quantify, in general it should be monotonically increasing, should flatten out at high bitrates, and should be zero when nothing is transmitted. Thus, the utility of the 3D block can be modeled as an affine function of the logarithm, $$u(B) = \begin{cases} \alpha \log(\beta B) & B > 0 \\ 0 & B = 0 \end{cases}, \qquad (7)$$

where α and β are normalization coefficients that bring u into the range [0,1] for all bitrates (e.g., bandwidths) $B_m$ of the representations m=1, . . . , M. These coefficients may then be kept constant for the duration of playback.

The second factor, the number of distinguishable voxels in a 3D block (e.g., the 3D block 531), can be modeled as the number of distinguishable voxels in the square area roughly covered by the 3D block, that is, the square of the number of degrees of view linearly across the 3D block times the number of distinguishable voxels per degree of view linearly across the 3D block. In turn, the number of degrees of view linearly across the 3D block is approximately the width of the 3D block divided by the distance of the 3D block from the viewing position (e.g., viewpoint). Furthermore, the number of distinguishable voxels per degree of view linearly across the 3D block is the minimum of the number of voxels per degree of view linearly across the 3D block and the number of pixels per degree of view across the display. This information may be computed (e.g., by the block selector 230) based on the viewing position and viewing frustum of the user 132, and based on the display resolution (e.g., passed to the block selector 230 from the rendering engine 240).

To be more specific, let the width of a 3D block (e.g., the 3D block 531) in a 3D space (e.g., in a virtual world or in the real world) be the width of the 3D block in voxels (object.tileWidth) times its cube-to-world scale (object.cubeToObjectScale), and let the FOV of the 3D block at unit distance be approximated by its width in the 3D space. Let the position of the 3D block in the 3D space be its (x,y,z) position in voxels (e.g., as determined from its Morton code) times its cube-to-object translation (object.cubeToObject Translation), and let the distance to the position of the 3D block from viewing position of the user 132 (e.g., viewpoint) v be dist(v). Then, the approximate FOV across the 3D block in radians is $$RAD_k(v) = \frac{object \cdot tileWidth * object \cdot cubeToObjectScale}{dist(v)}. \quad (8)$$

Next, let the number of voxels in the 3D block per radian be the width in voxels of the corresponding bounding cube in the corresponding representation n (object.representation[n].width), divided by the width of the bounding cube in the 3D space (object.maxWidth*object.cubeToObjectScale), times the distance to the 3D block (e.g., the 3D block 531):

$$VPR_k(n, v) = \frac{object \cdot representation[n] \cdot width * dist(v)}{object \cdot maxWidth * object \cdot cubeToObjectScale}. \quad (9)$$

Finally, let the number of pixels per radian across the display of the device 130 be the number of pixels across the display (display.horzPixels) divided by the FOV of the viewing frustum of the user 132, $$PPR_k(v) = \frac{display \cdot horzPixels}{view[v] \cdot frustum \cdot horzFOV}. \quad (10)$$

Then, the minimum of $VPR_k(n, v)$ and $PPR_k(v)$ is the number of distinguishable voxels per degree across the 3D block (e.g., the 3D block 531), and $$LOD_k(n,v)=[RAD_k(v)*\min\{VPR_k(n,v),PPR_k(v)\}]^2, \quad (11)$$

is the number of distinguishable voxels in the square area roughly covered by the 3D block.

The third factor in the utility score of a 3D block (e.g., the 3D block 531) is the probability $P_k(v)$ that if the current viewing location (e.g., the current viewpoint) is v, then the 3D block k will be visible at or by the time the 3D block emerges from the trailing edge of the window and is displayed to the user 132.

The uncertainty of whether the 3D block k will be visible by the time it emerges from the window is due to the uncertainty of the user's behavior in the interim. If the viewing location of the user 132 could be accurately predicted, then $P_k(v)$ could be set close to 0 or 1. If it were close to 0, then the utility score of the 3D block would be close to 0, and no bits would need to be wasted in transmitting the 3D block. The bits could be used instead to improve the quality of other 3D blocks for which $P_k(v)$ is close to 1.

Thus, for AR streaming, user prediction may be important, just as network prediction is important for all streaming. User adaptivity and network adaptivity may be seen as analogous in the context of AR streaming.

One way to perform user prediction is to predict that, if a 3D block (e.g., the 3D block 531) k has media time (e.g., presentation time) $\tau_k$, the 3D block will be visible to the user 132 when it emerges from the window if its position (e.g., presentation position) in the 3D space is visible to the user 132 in the current viewing frustum (e.g., current view) v at time t, with prediction error probability 0.1 if the 3D block is early in the window (e.g., close to the trailing edge $W_{trail}(t)$), increasing linearly to 0.4 if the 3D block is late in the window (e.g., close to the leading edge $W_{lead}(t)=W_{trail}(t)+\Delta W(t)$). That is, $$P_k(v) = \begin{cases} 1 - P_k^{err}(v) & \text{if } k \text{ currently visible from } v \\ P_k^{err}(v) & \text{otherwise} \end{cases}, \quad (12)$$

where $$P_k^{err}(v) = 0.1 + 0.3 \min\{1, (\tau_k - W_{lead}(t))/\Delta W(t)\}. \quad (13)$$

This models increasing uncertainty regarding what the user 132 will be viewing further away into the future. In some example embodiments, this approach is supplemented or replaced with machine learning for more accurate predictions.

According to various example embodiments, the block selector 230 of the device 130 is configured to implement an algorithm for utility maximization that is greedy yet provably optimal. To begin, it is helpful to write a constrained maximization problem as maximizing $$U(\mathcal{M}) = \sum_{k=1}^{K} U_k(m_k) \quad (14)$$

subject to $$R(\mathcal{M}) = \sum_{k=1}^{K} b_k(m_k) \le R_i, \quad (15)$$

where $\mathcal{M} = \{m_1, \ldots, m_K\}$ are the representations (e.g., the representation 520) corresponding to all 3D blocks (e.g., the 3D block 531) 1, ..., K that are in the window, and $b_k(m)$ is the number of bits that would be used to obtain a 3D block that is spatially and temporally coincident with the 3D block k from the representation m. If $m=n_k$, the representation corresponding to the 3D block k already in the buffer, then $b_k(n_k)=0$, because it takes no additional bits to get a spatially and temporally coincident 3D block from the representation $n_k$. If there is no spatially and temporally coincident 3D block from any representation yet in the buffer, then $n_k=0$, and still $b_k(0)=0$. By convention, $U_k(0)=0$.

The search for the optimal $\mathcal{M}$ can be restricted to the upper convex hull $\hat{S}$ of the set of points $S=\{(R(\mathcal{M}), U(\mathcal{M}))\}$ in the rate-utility plane, and it may be therefore more direct to solve the problem of maximizing the Lagrangian $$U(\mathcal{M}) - \lambda R(\mathcal{M}) = \sum_{k=1}^{K} [U_k(m_k) - \lambda b_k(m_k)] \tag{16}$$

for some $\lambda > 0$. Moreover, $$\max_{\mathcal{M}} U(\mathcal{M}) - \lambda R(\mathcal{M}) = \tag{17}$$

$$\max_{\{m_1,\ldots,m_K\}} \sum_{k=1}^{K} [U_k(m_k) - \lambda b_k(m_k)] = \sum_{k=1}^{K} \max_{m} [U_k(m) - \lambda b_k(m)],$$

so the maximization problem can be solved independently for each 3D block (e.g., the 3D block 531). Not only does the convex hull $\hat{S}$ outperform S in the sense that for any point $(R, U) \in S$, there exists a dominating point $(\hat{R}, \hat{U}) \in \hat{S}$ such that $\hat{R} \leq R$ and $\hat{U} \geq U$, but also every point on $\hat{S}$ can be achieved with timesharing or randomization between points in S. For each $\lambda$, the solution $$m_k(\lambda) = \operatorname{argmax}_{m} [U_k(m) - \lambda b_k(m)] \tag{18}$$

for the 3D block k lies on the upper convex hull $\hat{S}_k$ of the set of points $S_k = \{(b_k(m), U_k(m))\}$ in the rate-utility plane, and the points on the vertices of the convex hull are swept out in order of increasing $b_k(m)$ as $\lambda$ decreases from infinity to zero.

To illustrate a rate-utility optimization algorithm, according to various example embodiments, consider a set of six rate-utility points $S=\{(b(m), U(m)): m=0, \ldots, 5\}$ for a given 3D block (e.g., the 3D block 531), with index 0 corresponding to the null representation and indices 1-5 corresponding to five representations for the corresponding 3D object (e.g., the asset 500) associated with the 3D block. These rate-utility points may each have different object.bandwidth[m]. Rate-utility points 0, 1, 2, 4, and 5 may lie on the upper convex hull S in order of increasing b(m). Let $\lambda_{01}$, $\lambda_{12}$, $\lambda_{24}$, and $\lambda_{45}$ be slopes of line segments between these points on $\hat{S}$. Then, the optimal representation for spatially and temporally coincident 3D blocks, at a given presentation time and presentation location in the 3D space, for any given $\lambda$ is $$m(\lambda) = \begin{cases} 0 & \lambda_{01} < \lambda < \infty \\ 1 & \lambda_{12} < \lambda \leq \lambda_{01} \\ 2 & \lambda_{24} < \lambda \leq \lambda_{12} \\ 4 & \lambda_{45} < \lambda \leq \lambda_{24} \\ 5 & 0 \leq \lambda \leq \lambda_{45} \end{cases} \tag{19}$$

For a given presentation time and presentation location of a 3D block (e.g., the 3D block 531), $\lambda_{01}$ is a threshold for $\lambda$ above which no representation is requested. The maximum such threshold across all 3D blocks is a threshold for $\lambda$ above which no representations are requested for any 3D blocks. As $\lambda$ decreases from this threshold, $b_k(m_k(\lambda))$ increases for every 3D block k, and hence $R(\mathcal{M})$ also increases. Thus, $\lambda$ can be decreased step-by-step until the constraint $R(\mathcal{M}) \leq R_i$ would be violated. For this value of $\lambda$, the 3D block from the representation $m_k(\lambda)$ which is spatially and temporally coincident with the 3D block k can be requested from the hologram streaming machine 110 if $m_k(\lambda) > 0$.

In some example embodiments, the rate-utility optimization algorithm is able to update, at a request opportunity $t_i$, the representation (e.g., the representation 520) for a given presentation time and presentation location in the 3D space and thereby update a 3D block (e.g., the 3D block 531) that remains in the window but was obtained from a different representation at the previous request opportunity $t_{i-1}$, for example, if the presentation time and presentation location of the 3D block suddenly increases in utility (e.g., as a result of the user 132 changing her viewing direction to look at it). In such example embodiments, the representation of the 3D block k from one or more previous request opportunities is saved in a variable $n_k$, and $b_k(n_k)$ is set to 0. In many scenarios, it would take 0 bits to obtain the 3D block k from the representation $n_k$ again at the current request opportunity. The utility score $U_k(n_k)$ may be left unchanged. Accordingly, the initial point on the upper convex hull for the 3D block k is $(0, U_k(n_k))$, rather than $(0,0)$. This may have the effect of the initial point of the upper convex hull, thus flattening the convex hull, making it difficult to reach other representations along the upper convex hull unless $\lambda$ is allowed to become large (e.g., if the estimated bit budget $R_i$ suddenly becomes large) or unless some other representation suddenly increases in utility (e.g., if the user 132 turns her head to look at the presentation location of the 3D block). An example of such a rate-utility optimization algorithm is shown in Table 1:

TABLE 1

RATE-UTILITY MAXIMIZATION ALGORITHM

Set $R_{current} = 0$
For each tile k:
  Set $m_k = n_k$ (the existing representation)

If $b_k(n_k) = \max_{m} b_k(m)$ then set $\lambda_k^* = 0$ and $m_k^* = n_k$.
Else set $$\lambda_k^* = \max_{m:b_k(m)>b_k(n_k)} \frac{U(m) - U(n_k)}{b_k(m) - b_k(n_k)},$$

$$m_k^* = \operatorname{argmax}_{m:b_k(m)>b_k(n_k)} \frac{U(m) - U(n_k)}{b_k(m) - b_k(n_k)}.$$

while $R_{current} < R_i$
  Let $k = \max_k \lambda_k^*$ be the tile with the greatest $\lambda_k^*$.
  If $\lambda_k^* \leq 0$ then break.
  Update $R_{current} = R_{current} + b_k(m_k^*) - b_k(n_k)$.
  Set $n_k = m_k^*$.

If $b_k(n_k) = \max_{m} b_k(m)$ then set $\lambda_k^* = 0$ and $m_k^* = n_k$.
  Else set $$\lambda_k^* = \max_{m:b_k(m)>b_k(n_k)} \frac{U(m) - U(n_k)}{b_k(m) - b_k(n_k)},$$

$$m_k^* = \operatorname{argmax}_{m:b_k(m)>b_k(n_k)} \frac{U(m) - U(n_k)}{b_k(m) - b_k(n_k)}.$$

end while

Figure 6:
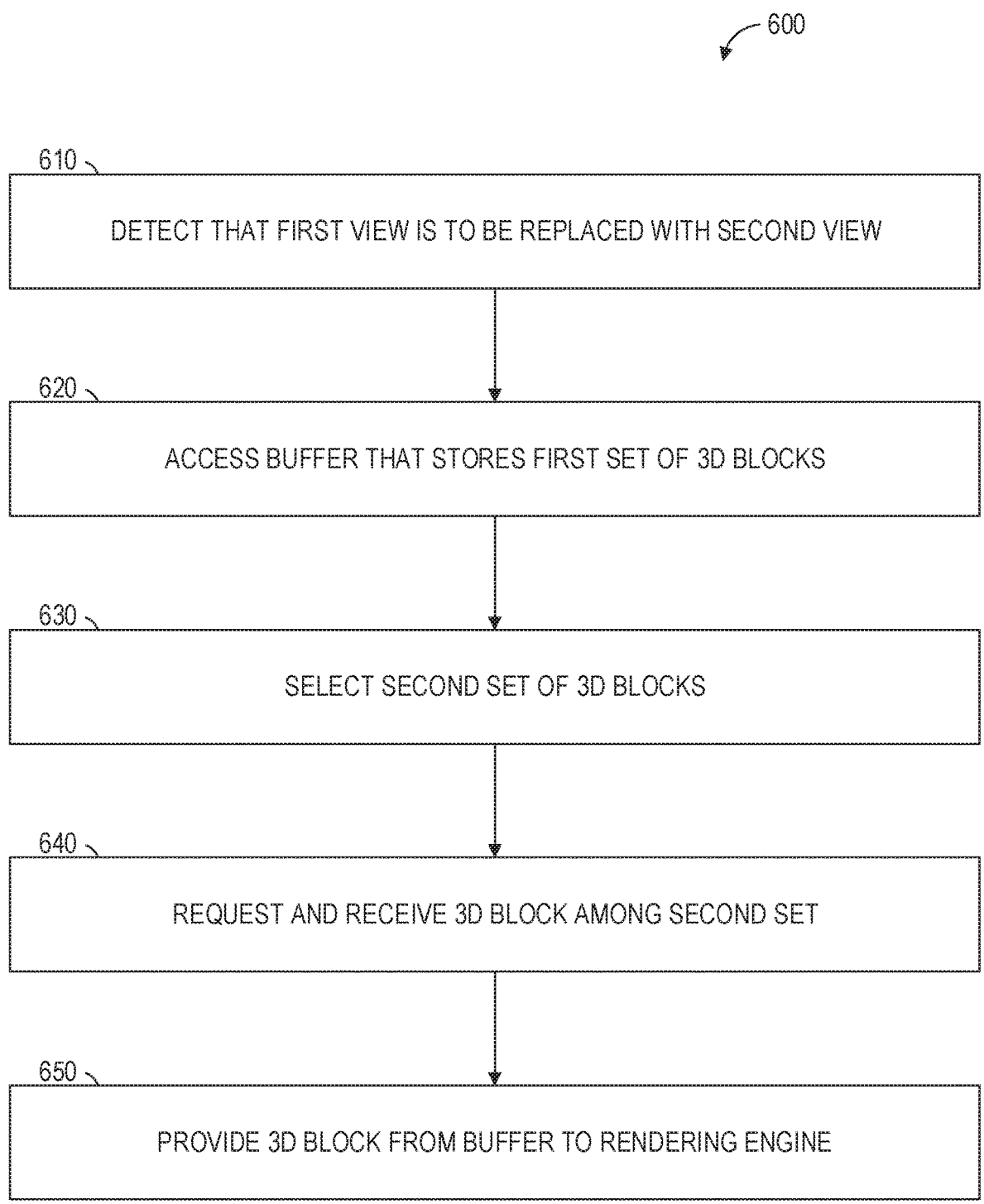
FIG. 6 and FIG. 7 are flowcharts illustrating operations of the device in performing a method of selecting, obtaining, and rendering a 3D block, according to some example embodiments.
Figure 7:
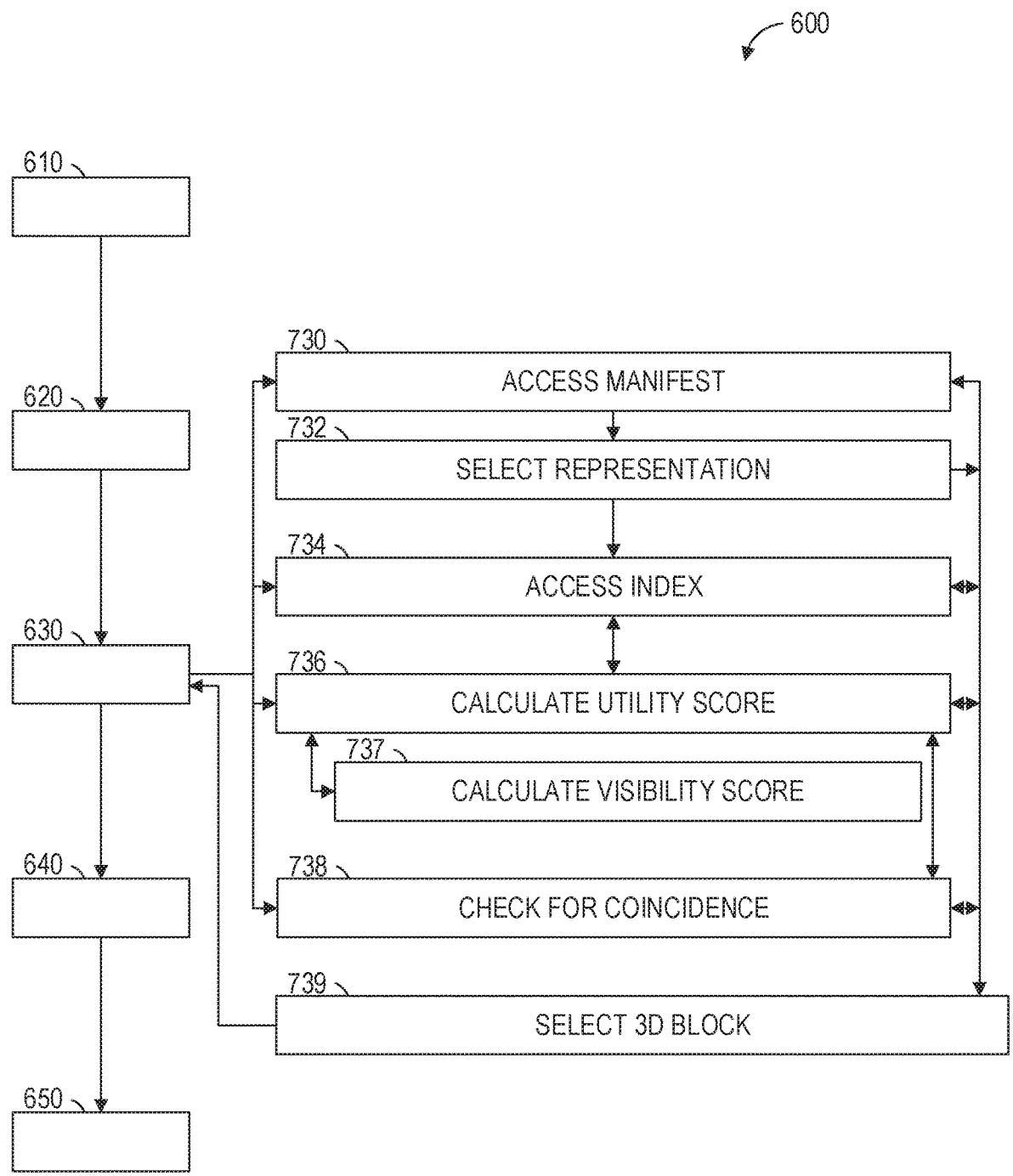

FIG. 6 and FIG. 7 are flowcharts illustrating operations of the device 130 in performing a method 600 of selecting, obtaining, and rendering a 3D block (e.g., the 3D block 531), according to some example embodiments. Operations in the method 600 may be performed by the device 130, using components (e.g., modules) described above with respect to FIG. 2, using one or more processors (e.g., microprocessors or other hardware processors), or using any suitable combination thereof. As shown in FIG. 6, the method 600 includes operations 610, 620, 630, 640, and 650.

In operation 610, the user interface 210 detects that a first view of 3D content in a 3D space is to be replaced with a second view of the 3D content in the 3D space. The 3D content may be or include one or more assets (e.g., the asset 500, which may be or include one or more 3D objects, such as a hologram that depicts a chair, a dog, a moving car, a walking person, or a flock of flying birds). As noted above, the 3D space is partitioned into 3D blocks, at least one of which is occupied by the 3D content. That is, the one or more occupied 3D blocks collectively enclose the 3D content. In this context, the first view is a first combination of viewing position and viewing direction with respect to the 3D content (e.g., from the perspective of the user 132 in viewing the 3D space); and the second view is a second combination of viewing position and viewing direction with respect to the 3D content (e.g., from the perspective of the user 132 in viewing the 3D space). For example, the user interface 210 may detect that the viewing position of the user 132, the viewing direction of the user 132, or both, has changed (e.g., as a result of the user 132 manipulating the device 130, which may be or include a head-mounted display, one or more motion sensors, or any suitable combination thereof).

In operation 620, the buffer manager 220 accesses a buffer that stores a first set of 3D blocks that were previously selected (e.g., by the block selector 230) based on the first view of the 3D content, requested (e.g., by the buffer manager 220 and from the hologram streaming machine 110, the database 115, or the content distribution network 120) based on the first view of the 3D content, and accordingly stored in the buffer (e.g., by the buffer manager 220). The buffer may be a window-based buffer (e.g., as described above with respect to FIG. 4). As noted above with respect to 3D blocks in general, the first set of 3D blocks partition (e.g., subdivide) the 3D space.

The first set of 3D blocks also collectively enclose at least a first portion of the 3D content. In addition, the first set of 3D blocks each have a different combination of presentation time and presentation location within the 3D space, such that, within the first set, temporally coincident 3D blocks with the same presentation time are not spatially coincident and do not have the same presentation location, and spatially coincident 3D blocks with the same presentation location are not temporally coincident and do not have the same presentation time. Furthermore, the first set of 3D blocks includes a first 3D block (e.g., similar to the 3D block 531) that has a first presentation time in the 3D space.

In operation 630, the block selector 230 selects a second set of 3D blocks in response to operation 610, in which the user interface 210 detects that the first view is to be replaced with the second view. The second set of 3D blocks is selected based on the second view of the 3D content. As noted above with respect to 3D blocks in general, the 3D blocks in the second set of 3D blocks partition the 3D space.

The second set of 3D blocks also collectively enclose at least a second portion of the 3D content. In addition, the second set of 3D blocks each have a different combination of presentation time and presentation location within the 3D space, such that, within the second set, temporally coincident 3D blocks with the same presentation time are not spatially coincident and do not have the same presentation location, and spatially coincident 3D blocks with the same presentation location are not temporally coincident and do not have the same presentation time. Furthermore, the second set of 3D blocks includes a second 3D block (e.g., the 3D block 531) that has a second presentation time in the 3D space, and the second presentation time is prior to (e.g., earlier than) the previously described first presentation time of the first 3D block in the first set of 3D blocks.

In operation 640, the buffer manager 220 requests and receives (e.g., from the hologram streaming machine 110, the database 115, or the content distribution network 120) one or more 3D blocks from the second set of 3D blocks. For clarity and brevity, the present discussion focuses on the buffer manager 220 requesting and receiving the second 3D block whose second presentation time is prior to the first presentation time of the first 3D block that is already stored in the buffer. In response to receipt of the second 3D block, the buffer manager 220 stores the second 3D block in the buffer by inserting the second 3D block non-sequentially into the buffer that already stores the first 3D block whose first presentation time is subsequent to (e.g., later than) the second presentation time of the second 3D block.

In operation 650, based on the second presentation time of the second 3D block, the rendering engine 240 obtains the second 3D block from the buffer for rendering the second view of the 3D content and subsequent display of the second view of the 3D content to the user 132. In some example embodiments, the buffer manager 220 provides the second 3D block from the buffer to the rendering engine 240 based on the second presentation time of the second 3D block. In certain example embodiments, based on the second presentation time of the second 3D block, the buffer manager 220 signals or otherwise causes the rendering engine 240 to read the second 3D block from the buffer.

Accordingly, performance of the method 600 results in the second 3D block (e.g., the 3D block 531) being selected based on the second view of the 3D content (e.g., resulting from a new viewing position, a new viewing direction, or both, within the 3D space), then inserted non-sequentially into the buffer despite the prior presence of the first 3D block in the same buffer, and then being used by the rendering engine 240 in accordance with its second presentation time. The first view of the 3D content depicts the first portion of the 3D content, for example, within a first viewing frustum (e.g., defined or otherwise specified by a first viewing position, a first viewing direction, or both) in the 3D space; and the second view of the 3D content depicts the second portion of the 3D content, for example, within a second viewing frustum (e.g., defined or otherwise specified by a second viewing position, a second viewing direction, or both) in the same 3D space.

In some example embodiments, the 3D content is or includes a voxelized 3D point cloud that is enclosed by a 3D bounding volume (e.g., a 3D bounding cube) within the 3D space. In such example embodiments, the first set of 3D blocks occupies at least a first portion of the 3D bounding volume, and the first set of 3D blocks are renderable during a first time span that includes the respectively corresponding presentation times of the first set of 3D blocks. Moreover, the first set of 3D blocks are renderable within a first viewing frustum (e.g., defined or otherwise specified by a first viewing position, a first viewing direction, or both) that includes the respectively corresponding presentation locations of the first set of 3D blocks. Similarly, the second set of 3D blocks occupies at least a second portion of the 3D bounding volume, and the second set of 3D blocks are renderable during a second time span that includes the respectively corresponding presentation times of the second set of 3D blocks. Furthermore, the second set of 3D blocks are renderable within the second viewing frustum (e.g., defined or otherwise specified by a second viewing position, the second viewing direction, or both) that includes the respectively corresponding presentation locations of the second set of 3D blocks.

As shown in FIG. 7, in addition to any one or more of the operations previously described, the method 600 may include one or more of operations 730, 732, 734, 736, 737, 738, and 739. One or more of operations 730, 732, 734, 736, 737, 738, and 739 may be performed as part (e.g., a precursor task, a subroutine, or a portion) of operation 630, in which the block selector 230 selects the second set of 3D blocks.

In operation 730, the block selector 230 accesses a manifest (e.g., the manifest 501). The manifest may be stored locally by the device 130 and accessed therefrom (e.g., after being downloaded from the hologram streaming machine 110, the database 115, or the content distribution network 120), or the manifest may be accessed via the network 190 (e.g., from the hologram streaming machine 110, the database 115, with a content distribution network 120). The accessed manifest describes multiple representations (e.g., similar to the representation 520) of a 3D object included in the 3D content. For example, the 3D object may be or include a single hologram that depicts a chair, a dog, a moving car, a walking person, or a flock of flying birds. As noted above, different representations of a 3D object differ in visual quality (e.g., bitrate, spatial resolution, temporal resolution, or any suitable combination thereof), and the multiple representations described by the accessed manifest accordingly differ in visual quality at which the 3D object (e.g., a hologram of a chair) is to be rendered. For example, the manifest may indicate that the multiple representations of the 3D object differ from each other in bitrate (e.g., as indicated by a bitrate value or a bitrate range for streaming), spatial resolution (e.g., as indicated by pixels or voxels per unit distance or per radian), temporal resolution (e.g., as indicated by frames per second), or any suitable combination thereof.

In operation 732, the block selector 230 selects a representation (e.g., the representation 520) from the multiple representations described by the manifest accessed in operation 730. The representation may be selected in accordance with any one or more of the methodologies described above for selecting a representation to provide a 3D block for a given presentation location and presentation time in the 3D space. For example, the representation may be selected based on its indicated bitrate, spatial resolution, temporal resolution, or any suitable combination thereof. As noted above, the accessed manifest correlates each described representation of the 3D object with one or more 3D blocks (e.g., similar to the 3D block 531) included in that representation. Accordingly, the accessed manifest correlates the selected representation of the 3D object with one or more corresponding 3D blocks. For example, the accessed manifest may correlate the selected representation with the second 3D block (e.g., the 3D block 531) that is included in the second set of 3D blocks being selected in operation 630. Furthermore, the selection of this representation may be a basis for selecting the second 3D block (e.g., the 3D block 531) for inclusion in the second set of 3D blocks that is being selected in operation 630.

In operation 734, the block selector 230 accesses an index (e.g., the index 511) that indicates presentation locations of corresponding 3D blocks, normal vectors of the corresponding 3D blocks, or both. The index may be stored locally by the device 130 and accessed therefrom (e.g., after being downloaded from the hologram streaming machine 110, the database 115, or the content distribution network 120), or the index may be accessed via the network 190 (e.g., from the hologram streaming machine 110, the database 115, with a content distribution network 120). The presentation location of the second 3D block (e.g., the 3D block 531), the normal vector of the second 3D block, or both, may be bases for selecting the second 3D block for inclusion in the second set of 3D blocks that is being selected in operation 630.

In operation 736, the block selector 230 calculates a utility score of the second 3D block (e.g., the 3D block 531). The calculation of the utility score for the second 3D block may be based on the second view of the 3D content and may be performed in accordance with any one or more of the methodologies described above for quantifying utility of a 3D block. In some example embodiments, the utility scores are calculated based on one or more descriptors of the representation (e.g., the representation 520) that corresponds to the second 3D block. As noted above, such descriptors of the representation (e.g., as indicated in the manifest accessed in operation 730) include its indicated bitrate, spatial resolution, temporal resolution, or any suitable combination thereof. Accordingly, the utility score of the second 3D block may be calculated based on the bitrate of its representation, the spatial resolution of misrepresentation, the temporal resolution of its representation, or any suitable combination thereof.

Operation 737 may be performed as part of operation 736. In operation 737, as part of calculating the utility score of the second 3D block (e.g., the 3D block 531), the block selector 230 calculates a visibility score of the second 3D block. The visibility score may be calculated based on an occlusion analysis of the second view of the 3D content. The second view of the 3D content may be defined or otherwise specified by a corresponding second viewing position with respect the 3D content in the 3D space, a corresponding second viewing direction with respect to the 3D content in the 3D space, or any suitable combination thereof. In example embodiments where the visibility score of the 3D block is calculated, the calculation of the utility score of the 3D block may be based on the calculated visibility score.

In operation 738, the block selector 230 performs a coincidence check by determining whether the second 3D block (e.g., the 3D block 531) is both spatially and temporally coincident with another 3D block (e.g., a third 3D block) already stored in the buffer (e.g., as part of the first set of 3D blocks or separate from the first set of 3D blocks). That is, the block selector 230 determines whether the second 3D block is coincident in presentation time and presentation location with another 3D block (e.g., the third 3D block) in the buffer. This determination may be a basis for selecting the second 3D block (e.g., the 3D block 531) for inclusion in the second set of 3D blocks that is being selected in operation 630.

In operation 739, the block selector 230 selects the second 3D block (e.g., the 3D block 531) for inclusion in the second set of 3D blocks that is being selected in operation 630. As noted above, the selection of the second 3D block may be based on its correlation with the representation selected in operation 732, the presentation location of the second 3D block, the normal vector of the second 3D block, the calculated utility score of the second 3D block, whether the second 3D block is temporally and spatially coincident with another 3D block (e.g., the third 3D block) already in the buffer, or any suitable combination thereof.

Figure 8:
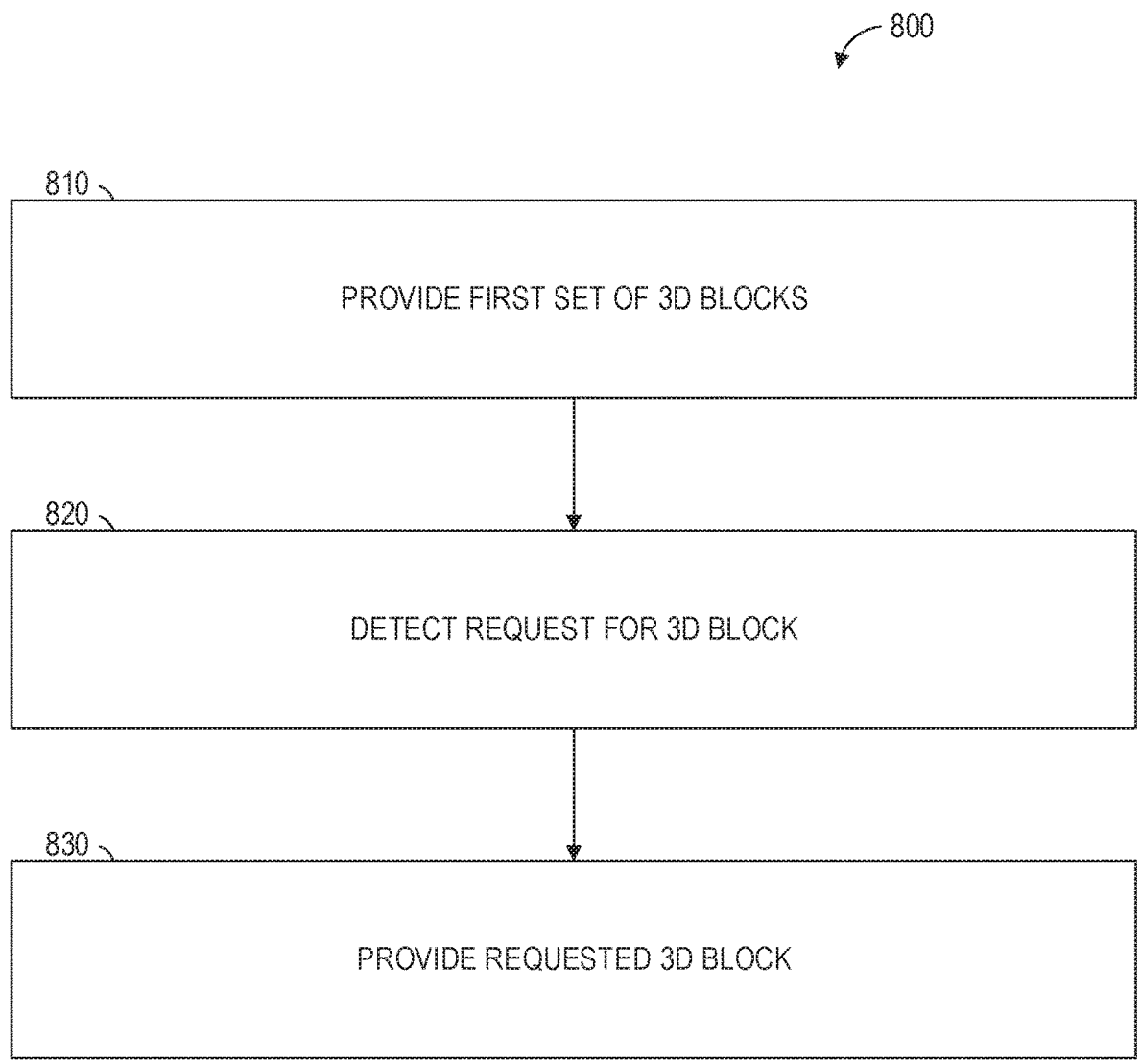
FIG. 8 is a flowchart illustrating operations of the hologram streaming machine in performing a method of providing a 3D block, according to some example embodiments.

FIG. 8 is a flowchart illustrating operations of the hologram streaming machine 110 in performing a method 800 of providing a 3D block (e.g., the 3D block 531), according to some example embodiments. Operations in the method 800 may be performed by the hologram streaming machine 110, using components (e.g., modules) described above with respect to FIG. 3, using one or more processors (e.g., microprocessors or other hardware processors), or using any suitable combination thereof. As shown in FIG. 8, the method 800 includes operations 810, 820, and 830.

In operation 810, the block server 330 provides a first set of 3D blocks to the device 130, and the providing of the first set of 3D blocks may be in response to one or more first requests that result from selection of the first set of 3D blocks by the device 130, whose selection of the first set of 3D blocks is based on a first view of 3D content. In some example embodiments, the block server 330 performs operation 810 by signaling the database interface 320 to interact with the database 115, the content distribution network 120, or both, and thereby cause the database 115, the content distribution network 120, or both to provide the first of 3D blocks to the device 130.

The first set of 3D blocks partition a 3D space in which the 3D content is to be viewed, and the first of the 3D blocks collectively enclose at least a first portion of the 3D content. In addition, the first set of 3D blocks each have a different combination of presentation time and presentation location within the 3D space, such that, within the first set, temporally coincident 3D blocks with the same presentation time are not spatially coincident and do not have the same presentation location, and spatially coincident 3D blocks with the same presentation location are not temporally coincident and do not have the same presentation time. Furthermore, the first set of 3D blocks includes a first 3D block (e.g., similar to the 3D block 531) that has a first presentation time in the 3D space. Furthermore, the first set of 3D blocks includes a first 3D block (e.g., similar to the 3D block 531) that has a first presentation time in the 3D space.

In operation 820, the request handler 310 detects a second request for a second 3D block (e.g., the 3D block 531) that has a second presentation time prior to (e.g., earlier than) the previously described first presentation time of the first 3D block in the first set of 3D blocks. The second request results from selection of a second set of 3D blocks by the device 130, whose selection of the second set of three blocks is based on a detection by the device 130 that a second view of the 3D content is to replace the first view of the 3D content.

The second set of 3D blocks partition the 3D space and collectively enclose at least a second portion of the 3D content. In addition, the second set of 3D blocks each have a different combination of presentation time and presentation location within the 3D space, such that, within the second set, temporally coincident 3D blocks with the same presentation time are not spatially coincident and do not have the same presentation location, and spatially coincident 3D blocks with the same presentation location are not temporally coincident and do not have the same presentation time.

In operation 830, the block server 330 provides the requested second 3D block (e.g., the 3D block 531) to the device 130, in response to the previously detected second request. In some example embodiments, the block server 330 performs operation 810 by signaling the database interface 320 to interact with the database 115, the content distribution network 120, or both, and thereby cause the database 115, the content distribution network 120, or both to provide the second 3D block (e.g., the 3D block 531) to the device 130. Since the second 3D block has the second presentation time prior to the first presentation time of previously provided first 3D block in the first set of 3D blocks, the second 3D block is provided non-sequentially to the device 130 after provision of the first 3D block to the device 130.

Accordingly, performance of the method 800 results in the second 3D block (e.g., the 3D block 531) being non-sequentially provided to the device 130 after being selected and requested based on the second view of the 3D content (e.g., resulting from a new viewing position, a new viewing direction, or both, within the 3D space). As noted above, the first view of the 3D content depicts the first portion of the 3D content, for example, within a first viewing frustum (e.g., defined or otherwise specified by a first viewing position, a first viewing direction, or both) in the 3D space; and the second view of the 3D content depicts the second portion of the 3D content, for example, within a second viewing frustum (e.g., defined or otherwise specified by a second viewing position, a second viewing direction, or both) in the same 3D space.

In some example embodiments, the 3D content is or includes a voxelized 3D point cloud that is enclosed by a 3D bounding volume (e.g., a 3D bounding cube) within the three space. In such example embodiments, the first set of 3D blocks occupies at least a first portion of the 3D bounding volume, and the first of 3D blocks are renderable during a first time span that includes the respectively corresponding presentation times of the first set of 3D blocks. Moreover, the first set of 3D blocks are renderable within a first viewing frustum (e.g., defined or otherwise specified by a first viewing position, a first viewing direction, or both) that includes the respectively corresponding presentation locations of the first set of 3D blocks. Similarly, the second set of 3D blocks occupies at least a second portion of the 3D bounding volume, and the second set of 3D blocks are renderable during a second time span that includes the respectively corresponding presentation times of the second set of 3D blocks. Furthermore, the second set of 3D blocks are renderable within the second viewing frustum (e.g., defined or otherwise specified by a second viewing position, the second viewing direction, or both, that includes the respectively corresponding presentation locations of the second set of 3D blocks.

According to various example embodiments, one or more of the methodologies described herein may facilitate streaming of volumetric media (e.g., holograms). Moreover, one or more of the methodologies described herein may facilitate improved network adaptivity; culling of 3D blocks depending on unpredicted user frustums to save network capacity; dynamic LOD depending on unpredicted user distance, display resolution, or both, to save network capacity; bitrate allocation among multiple simultaneous 3D objects; sub-second response times to load new representations as requested for user interaction; fast starts to rendering of volumetric media; responsive trick modes (e.g., seek and fast-forward) in playback of volumetric media; and improved visual quality on subsequent replays of volumetric media as higher quality representations are obtained and stored. Hence, one or more of the methodologies described herein may facilitate improved user experiences with volumetric media, as well as improved usage of network and computing resources in delivering streams of volumetric media, compared to capabilities of pre-existing systems and methods.

When these effects are considered in aggregate, one or more of the methodologies described herein may obviate a need for certain efforts or resources that otherwise would be involved in streaming volumetric media. Efforts expended by a user in obtaining and experiencing volumetric media, as well as efforts expended by an administrator in providing volumetric media, may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 9:
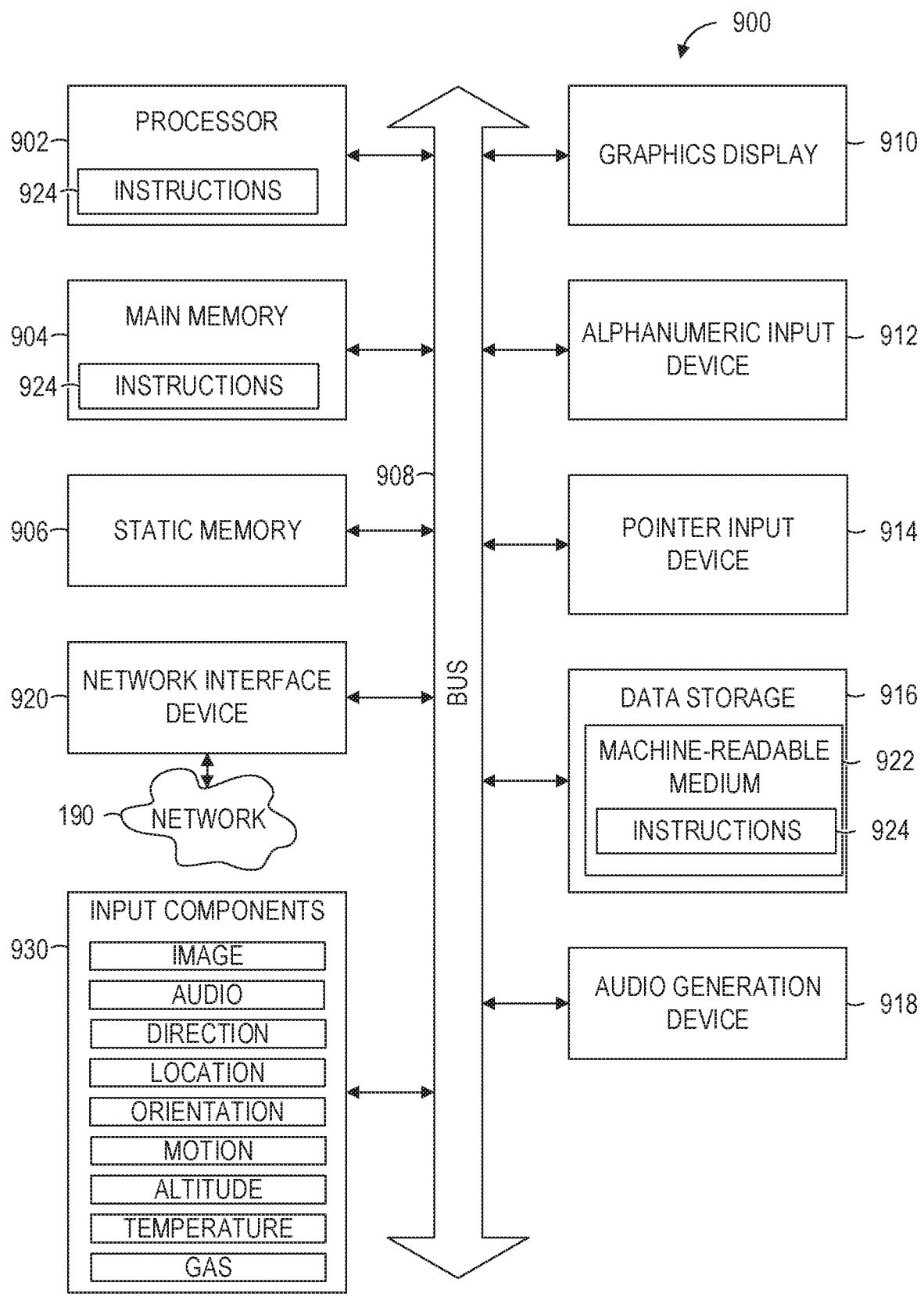
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device or may be communicatively coupled (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 904, and a static memory 906, which are configured to communicate with each other via a bus 908. The processor 902 contains solid-state digital microcircuits (e.g., electronic, optical, or both) that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein. In some example embodiments, the processor 902 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 900 with at least the processor 902, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a pointer input device 914 (e.g., a mouse, a touchpad, a touchscreen, a trackball, a joystick, a stylus, a motion sensor, an eye tracking device, a data glove, or other pointing instrument), a data storage 916, an audio generation device 918 (e.g., a sound card, an amplifier, a speaker, a headphone jack, or any suitable combination thereof), and a network interface device 920.

The data storage 916 (e.g., a data storage device) includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the static memory 906, within the processor 902 (e.g., within the processor's cache memory), or any suitable combination thereof, before or during execution thereof by the machine 900. Accordingly, the main memory 904, the static memory 906, and the processor 902 may be considered machine-readable media (e.g., tangible and non-transitory machine-readable media). The instructions 924 may be transmitted or received over the network 190 via the network interface device 920. For example, the network interface device 920 may communicate the instructions 924 using any one or more transfer protocols (e.g., hypertext transfer protocol (HTTP)).

In some example embodiments, the machine 900 may be a portable computing device (e.g., a smart phone, a tablet computer, or a wearable device), and may have one or more additional input components 930 (e.g., sensors or gauges). Examples of such input components 930 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 930 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 924 for execution by the machine 900 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 924).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where α hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein.

A first example provides a method comprising:

detecting, by one or more processors of a machine, that a first view of three-dimensional (3D) content in a 3D space is to be replaced with a second view of the 3D content in the 3D space;

accessing, by one or more processors of the machine, a buffer that stores a first set of 3D blocks that partition the 3D space, collectively enclose at least a first portion of the 3D content, and each have a different combination of presentation time and presentation location in the 3D space, the first set of 3D blocks being requested based on the first view of the 3D content and including a first 3D block that has a first presentation time:

in response to the detecting that the second view is to replace the first view, and by one or more processors of the machine, selecting a second set of 3D blocks that partition the 3D space, collectively enclose at least a second portion of the 3D content, and each have a different combination of presentation time and presentation location in the 3D space, the second set of 3D blocks being selected based on the second view of the 3D content and including a second 3D block that has a second presentation time prior to the first presentation time of the first 3D block;

requesting and receiving, by one or more processors of the machine, the second 3D block from a provider of the 3D content, the received second 3D block being inserted non-sequentially into the buffer that stores the first 3D block; and based on the second presentation time of the second 3D block, and by one or more processors of the machine, providing the second 3D block from the buffer to a rendering engine configured to render the second view of the 3D content in the 3D space.

A second example provides a method according to the first example, wherein:

the first view depicts the first portion of the 3D content, the first portion being visible within a first viewing frustum;

the second view depicts the second portion of the 3D content, the second portion being visible within a second viewing frustum; and the first and second viewing frustums differ in at least one of viewing direction relative to the 3D content or viewing position relative to the 3D content.

A third example provides a method according to the first example or the second example, wherein:

the 3D content includes a voxelized 3D point cloud enclosed by a 3D bounding volume in the 3D space;

the first set of 3D blocks occupies at least a first portion of the 3D bounding volume, the first set of 3D blocks being renderable during a first time span that includes their corresponding presentation times and renderable within a first viewing frustum that includes their corresponding presentation locations; and the second set of 3D blocks occupies at least a second portion of the 3D bounding volume, the second set of 3D blocks being renderable during a second time span that includes their corresponding presentation times and renderable within a second viewing frustum that includes their corresponding presentation locations.

A fourth example provides a method according to any of the first through third examples, wherein:

the selecting of the second set of 3D blocks includes:
accessing a manifest that describes multiple representations of a 3D object included in the 3D content, the multiple representations differing in visual quality at which the 3D object is to be rendered;
selecting a representation of the 3D object among the multiple representations of the 3D object, the manifest correlating the selected representation of the 3D object with the second 3D block; and
selecting the second 3D block based on its correlation with the selected representation of the 3D object.

A fifth example provides a method according to the fourth example, wherein:
the manifest indicates that the multiple representations of the 3D object differ from each other in at least one of bitrates, spatial resolutions, or temporal resolutions; and
the selecting of the representation among the multiple representations is based on at least one of a bitrate of the representation, a spatial resolution of the representation, or a temporal resolution of the representation.

A sixth example provides a method according to any of the first through fifth examples, wherein:
the selecting of the second set of 3D blocks includes:
accessing an index that indicates at least one of a presentation location of the second 3D block or a normal vector of the second 3D block; and
selecting the second 3D block based on at least one of its presentation location or its normal vector.

A seventh example provides a method according to any of the first through sixth examples, wherein:
the selecting of the second set of 3D blocks includes:
calculating a utility score of the second 3D block; and
selecting the second 3D block based on its calculated utility score.

An eighth example provides a method according to the seventh example, wherein:
the selecting of the second set of 3D blocks includes:
accessing a manifest that correlates a representation of a 3D object included in the 3D content with at least one of a bitrate of the representation, a spatial resolution of the representation, or a temporal resolution of the representation, the manifest further correlating the representation with the second 3D block; and
the calculating of the utility score of the second 3D block is based on at least one of the bitrate of the representation correlated with the second 3D block, the spatial resolution of the representation correlated with the second 3D block, or the temporal resolution of the representation correlated with the second 3D block.

A ninth example provides a method according to the seventh example or the eighth example, wherein:
the selecting of the second set of 3D blocks includes:
calculating a visibility score of the second 3D block based on at least one of an occlusion analysis of the second view of the 3D content, a viewing direction of the second view of the 3D content, or a viewing position of the second view of the 3D content; and
the calculating of the utility score of the second 3D block is based on the calculated visibility score.

A tenth example provides a method according to any of the seventh through ninth examples, wherein:
the selecting of the second set of 3D blocks includes:
determining whether the second 3D block is coincident in presentation time and presentation location to a third 3D block already stored in the buffer; and
the calculating of the utility score of the second 3D block is based on whether the second 3D block is coincident in presentation time and presentation location to the third 3D block already stored in the buffer.

An eleventh example provides a method comprising:
providing, by one or more processors of a machine, a first set of three-dimensional (3D) blocks that partition a 3D space, collectively enclose at least a first portion of 3D content in the 3D space, and each have a different combination of presentation time and presentation location in the 3D space, the providing of the first set of 3D blocks being to a client device and in response to at least one first request resultant from selection of the first set of 3D blocks by the client device based on a first view of the 3D content, the first set of 3D blocks including a first 3D block that has a first presentation time;
detecting, by one or more processors of the machine, a second request for a second 3D block that has a second presentation time prior to the first presentation time of the first 3D block, the second request being resultant from selection of a second set of 3D blocks by the client device based on a detection by the client device that a second view of the 3D content is to replace the first view of the 3D content, the second set of 3D blocks partitioning the 3D space, collectively enclosing at least a second portion of the 3D content in the 3D space, and each having a different combination of presentation time and presentation location in the 3D space; and
providing, in response to the detected second request and by one or more processors of the machine, the requested second 3D block non-sequentially to the client device after provision of the first 3D block to the client device.

A twelfth example provides a method according to the eleventh example, wherein:
the first view depicts the first portion of the 3D content, the first portion being visible within a first viewing frustum;
the second view depicts the second portion of the 3D content, the second portion being visible within a second viewing frustum; and
the first and second viewing frustums differ in at least one of viewing direction relative to the 3D content or viewing position relative to the 3D content.

A thirteenth example provides a method according to the eleventh example of the twelfth example, wherein:
the 3D content includes a voxelized 3D point cloud enclosed by a 3D bounding volume in the 3D space;
the first set of 3D blocks occupies at least a first portion of the 3D bounding volume, the first subset of 3D blocks being renderable during a first time span that includes their corresponding presentation times and renderable within a first viewing frustum that includes their corresponding presentation locations; and
the second set of 3D blocks occupies at least a second portion of the 3D bounding volume, the second subset of 3D blocks being renderable during a second time span that includes their corresponding presentation times and renderable within a second viewing frustum that includes their corresponding presentation locations.

A fourteenth example provides a machine-readable medium (e.g., a non-transitory machine-readable storage medium) comprising instructions that, when executed by one or more processors of a machine, cause the machine to perform operations comprising:
detecting that a first view of three-dimensional (3D) content in a 3D space is to be replaced with a second view of the 3D content in the 3D space;
accessing a buffer that stores a first set of 3D blocks that partition the 3D space, collectively enclose at least a first portion of the 3D content, and each have a different combination of presentation time and presentation location in the 3D space, the first set of 3D blocks being requested based on the first view of the 3D content and including a first 3D block that has a first presentation time;

in response to the detecting that the second view is to replace the first view, selecting a second set of 3D blocks that partition the 3D space, collectively enclose at least a second portion of the 3D content, and each have a different combination of presentation time and presentation location in the 3D space, the second set of 3D blocks being selected based on the second view of the 3D content and including a second 3D block that has a second presentation time prior to the first presentation time of the first 3D block;

requesting and receiving the second 3D block from a provider of the 3D content, the received second 3D block being inserted non-sequentially into the buffer that stores the first 3D block; and based on the second presentation time of the second 3D block, providing the second 3D block from the buffer to a rendering engine configured to render the second view of the 3D content in the 3D space.

A fifteenth example provides a machine-readable medium (e.g., a non-transitory machine-readable storage medium) comprising instructions that, when executed by one or more processors of a machine, cause the machine to perform operations comprising:

providing a first set of three-dimensional (3D) blocks that partition a 3D space, collectively enclose at least a first portion of 3D content in the 3D space, and each have a different combination of presentation time and presentation location in the 3D space, the providing of the first set of 3D blocks being to a client device and in response to at least one first request resultant from selection of the first set of 3D blocks by the client device based on a first view of the 3D content, the first set of 3D blocks including a first 3D block that has a first presentation time;

detecting a second request for a second 3D block that has a second presentation time prior to the first presentation time of the first 3D block, the second request being resultant from selection of a second set of 3D blocks by the client device based on a detection by the client device that a second view of the 3D content is to replace the first view of the 3D content, the second set of 3D blocks partitioning the 3D space, collectively enclosing at least a second portion of the 3D content in the 3D space, and each having a different combination of presentation time and presentation location in the 3D space; and providing, in response to the detected second request, the requested second 3D block non-sequentially to the client device after provision of the first 3D block to the client device.

A sixteenth example provides a system (e.g., a computer system or other machine) comprising:
one or more processors; and
a memory storing instructions that, when executed by at least one processor among the one or more processors, cause the system to perform operations comprising:
detecting that a first view of three-dimensional (3D) content in a 3D space is to be replaced with a second view of the 3D content in the 3D space;
accessing a buffer that stores a first set of 3D blocks that partition the 3D space, collectively enclose at least a first portion of the 3D content, and each have a different combination of presentation time and presentation location in the 3D space, the first set of 3D blocks being requested based on the first view of the 3D content and including a first 3D block that has a first presentation time;

in response to the detecting that the second view is to replace the first view, selecting a second set of 3D blocks that partition the 3D space, collectively enclose at least a second portion of the 3D content, and each have a different combination of presentation time and presentation location in the 3D space, the second set of 3D blocks being selected based on the second view of the 3D content and including a second 3D block that has a second presentation time prior to the first presentation time of the first 3D block;

requesting and receiving the second 3D block from a provider of the 3D content, the received second 3D block being inserted non-sequentially into the buffer that stores the first 3D block; and based on the second presentation time of the second 3D block, providing the second 3D block from the buffer to a rendering engine configured to render the second view of the 3D content in the 3D space.

A seventeenth example provides a system (e.g., a computer system or other machine) comprising:
one or more processors; and
a memory storing instructions that, when executed by at least one processor among the one or more processors, cause the system to perform operations comprising:
providing a first set of three-dimensional (3D) blocks that partition a 3D space, collectively enclose at least a first portion of 3D content in the 3D space, and each have a different combination of presentation time and presentation location in the 3D space, the providing of the first set of 3D blocks being to a client device and in response to at least one first request resultant from selection of the first set of 3D blocks by the client device based on a first view of the 3D content, the first set of 3D blocks including a first 3D block that has a first presentation time;

detecting a second request for a second 3D block that has a second presentation time prior to the first presentation time of the first 3D block, the second request being resultant from selection of a second set of 3D blocks by the client device based on a detection by the client device that a second view of the 3D content is to replace the first view of the 3D content, the second set of 3D blocks partitioning the 3D space, collectively enclosing at least a second portion of the 3D content in the 3D space, and each having a different combination of presentation time and presentation location in the 3D space; and providing, in response to the detected second request, the requested second 3D block non-sequentially to the client device after provision of the first 3D block to the client device.

An eighteenth example provides a method comprising:
detecting, by one or more processors of a machine, that a first view of three-dimensional (3D) content in a 3D space is to be replaced with a second view of the 3D content in the 3D space;
accessing, by one or more processors of the machine, a data structure that correlates a representation of a 3D object included in the 3D content with at least one of a bitrate of the representation, a spatial resolution of the representation, or a temporal resolution of the representation, the data structure further correlating the representation with a 3D block that encloses at least part of the 3D object;
in response to the detecting that the second view is to replace the first view and by one or more processors of the machine, selecting a set of 3D blocks that partition the 3D space, collectively enclose at least a portion of the 3D content, and each have a different combination of presentation time and presentation location in the 3D space, the selecting of the set of 3D blocks being based on the second view of the 3D content and including:
calculating a utility score of the 3D block based on at least one of the bitrate of the representation correlated with the 3D block, the spatial resolution of the representation correlated with the 3D block, or the temporal resolution of the representation correlated with the 3D block; and
selecting the 3D block for inclusion in the set of 3D blocks based on its calculated utility score;
requesting and receiving, by one or more processors of the machine, the selected 3D block from a provider of the 3D content; and
providing, by one or more processors of the machine, the 3D block to a rendering engine configured to render the second view of the 3D content in the 3D space.

A nineteenth example provides a method according to the eighteenth example, wherein:
the first view depicts a first portion of the 3D content, the first portion being visible within a first viewing frustum;
the second view depicts a second portion of the 3D content, the second portion being visible within a second viewing frustum; and
the first and second viewing frustums differ in at least one of viewing direction relative to the 3D content or viewing position relative to the 3D content.

A twentieth example provides a method according to the eighteenth example or the nineteenth example, wherein:
the 3D content includes a voxelized 3D point cloud enclosed by a 3D bounding volume in the 3D space; and
the selected set of 3D blocks occupies at least a portion of the 3D bounding volume, the selected set of 3D blocks being renderable during a time span that includes their corresponding presentation times and renderable within a viewing frustum that includes their corresponding presentation locations.

A twenty-first example provides a method according to any of the eighteenth through twentieth examples, wherein:
the selecting of the set of 3D blocks includes:
accessing an index that indicates at least one of a presentation location of the 3D block or a normal vector of the 3D block; and
selecting the 3D block based on at least one of its presentation location or its normal vector.

A twenty-second example provides a method according to any of the eighteenth through twenty-first examples, wherein:
the selecting of the set of 3D blocks includes:
calculating a visibility score of the 3D block based on at least one of an occlusion analysis of the second view of the 3D content, a viewing direction of the second view of the 3D content, or a viewing position of the second view of the 3D content; and
the calculating of the utility score of the 3D block is based on the calculated visibility score.

A twenty-third example provides a method according to any of the eighteenth through twenty-second examples, wherein:
the requested and received 3D block is a second 3D block included in a second set of 3D blocks that partition the 3D space, collectively enclose at least a second portion of the 3D content, and each have a different combination of presentation time and presentation location in the 3D space, the second set of 3D blocks being selected based on the second view of the 3D content, the second 3D block having a second presentation time; and the method further comprises:
inserting the second 3D block non-sequentially into a buffer that already stores a first set of 3D blocks that partition the 3D space, collectively enclose at least a first portion of the 3D content, and each have a different combination of presentation time and presentation location in the 3D space, the first set of 3D blocks being requested based on the first view of the 3D content and including a first 3D block that has a first presentation time subsequent to the second presentation time of the second 3D block.

A twenty-fourth example provides a method according to the twenty-third example, wherein:
the selecting of the second set of 3D blocks includes:
determining whether the second 3D block is coincident in presentation time and presentation location to a third 3D block already stored in the buffer; and
the calculating of the utility score of the second 3D block is based on whether the second 3D block is coincident in presentation time and presentation location to the third 3D block already stored in the buffer.

A twenty-fifth example provides a method comprising:
providing, by one or more processors of a machine, a first set of three-dimensional (3D) blocks that partition a 3D space, collectively enclose at least a first portion of 3D content in the 3D space, and each have a different combination of presentation time and presentation location in the 3D space, the providing of the first set of 3D blocks being to a client device and in response to at least one first request resultant from selection of the first set of 3D blocks by the client device based on a first view of the 3D content;
detecting, by one or more processors of the machine, a second request for a second 3D block, the second request being resultant from selection of a second set of 3D blocks by the client device based on a detection by the client device that a second view of the 3D content is to replace the first view of the 3D content, the second set of 3D blocks partitioning the 3D space, collectively enclosing at least a second portion of the 3D content in the 3D space, and each having a different combination of presentation time and presentation location in the 3D space, the second 3D block being selected by the client device based on a corresponding utility score calculated based on at least one of a bitrate of a representation of a 3D object included in the 3D content and correlated with the second 3D block by a data structure, a spatial resolution of the representation, or a temporal resolution of the representation; and
providing, by one or more processors of the machine, the requested second 3D block to the client device in response to the detected second request, the client device being configured to render the second view of the 3D content in the 3D space.

A twenty-sixth example provides a method according to the twenty-fifth example, wherein:
the 3D content includes a voxelized 3D point cloud enclosed by a 3D bounding volume in the 3D space;
the first set of 3D blocks occupies at least a first portion of the 3D bounding volume, the first set of 3D blocks being renderable during a first time span that includes their corresponding presentation times and renderable within a first viewing frustum that includes their corresponding presentation locations; and
the second set of 3D blocks occupies at least a second portion of the 3D bounding volume, the second set of 3D blocks being renderable during a second time span that includes their corresponding presentation times and renderable within a second viewing frustum that includes their corresponding presentation locations.

A twenty-seventh example provides a machine-readable medium (e.g., a non-transitory machine-readable storage medium) comprising instructions that, when executed by one or more processors of a machine, cause the machine to perform operations comprising:

detecting that a first view of three-dimensional (3D) content in a 3D space is to be replaced with a second view of the 3D content in the 3D space;

accessing a data structure that correlates a representation of a 3D object included in the 3D content with at least one of a bitrate of the representation, a spatial resolution of the representation, or a temporal resolution of the representation, the data structure further correlating the representation with a 3D block that encloses at least part of the 3D object;

in response to the detecting that the second view is to replace the first view, selecting a set of 3D blocks that partition the 3D space, collectively enclose at least a portion of the 3D content, and each have a different combination of presentation time and presentation location in the 3D space, the selecting of the set of 3D blocks being based on the second view of the 3D content and including:

calculating a utility score of the 3D block based on at least one of the bitrate of the representation correlated with the 3D block, the spatial resolution of the representation correlated with the 3D block, or the temporal resolution of the representation correlated with the 3D block; and selecting the 3D block for inclusion in the set of 3D blocks based on its calculated utility score;

requesting and receiving the selected 3D block from a provider of the 3D content; and providing the 3D block to a rendering engine configured to render the second view of the 3D content in the 3D space.

A twenty-eighth example provides a machine-readable medium (e.g., a non-transitory machine-readable storage medium) comprising instructions that, when executed by one or more processors of a machine, cause the machine to perform operations comprising:

providing a first set of three-dimensional (3D) blocks that partition a 3D space, collectively enclose at least a first portion of 3D content in the 3D space, and each have a different combination of presentation time and presentation location in the 3D space, the providing of the first set of 3D blocks being to a client device and in response to at least one first request resultant from selection of the first set of 3D blocks by the client device based on a first view of the 3D content;

detecting a second request for a second 3D block, the second request being resultant from selection of a second set of 3D blocks by the client device based on a detection by the client device that a second view of the 3D content is to replace the first view of the 3D content, the second set of 3D blocks partitioning the 3D space, collectively enclosing at least a second portion of the 3D content in the 3D space, and each having a different combination of presentation time and presentation location in the 3D space, the second 3D block being selected by the client device based on a corresponding utility score calculated based on at least one of a bitrate of a representation of a 3D object included in the 3D content and correlated with the second 3D block by a data structure, a spatial resolution of the representation, or a temporal resolution of the representation; and providing the requested second 3D block to the client device in response to the detected second request, the client device being configured to render the second view of the 3D content in the 3D space.

A twenty-ninth example provides a system (e.g., a computer system or other machine) comprising:

one or more processors; and a memory storing instructions that, when executed by at least one processor among the one or more processors, cause the system to perform operations comprising:

detecting that a first view of three-dimensional (3D) content in a 3D space is to be replaced with a second view of the 3D content in the 3D space;

accessing a data structure that correlates a representation of a 3D object included in the 3D content with at least one of a bitrate of the representation, a spatial resolution of the representation, or a temporal resolution of the representation, the data structure further correlating the representation with a 3D block that encloses at least part of the 3D object;

in response to the detecting that the second view is to replace the first view, selecting a set of 3D blocks that partition the 3D space, collectively enclose at least a portion of the 3D content, and each have a different combination of presentation time and presentation location in the 3D space, the selecting of the set of 3D blocks being based on the second view of the 3D content and including:

calculating a utility score of the 3D block based on at least one of the bitrate of the representation correlated with the 3D block, the spatial resolution of the representation correlated with the 3D block, or the temporal resolution of the representation correlated with the 3D block; and selecting the 3D block for inclusion in the set of 3D blocks based on its calculated utility score;

requesting and receiving the selected 3D block from a provider of the 3D content; and providing the 3D block to a rendering engine configured to render the second view of the 3D content in the 3D space.

A thirtieth example provides a system (e.g., a computer system or other machine) comprising:

one or more processors; and a memory storing instructions that, when executed by at least one processor among the one or more processors, cause the system to perform operations comprising:

providing a first set of three-dimensional (3D) blocks that partition a 3D space, collectively enclose at least a first portion of 3D content in the 3D space, and each have a different combination of presentation time and presentation location in the 3D space, the providing of the first set of 3D blocks being to a client device and in response to at least one first request resultant from selection of the first set of 3D blocks by the client device based on a first view of the 3D content;

detecting a second request for a second 3D block, the second request being resultant from selection of a second set of 3D blocks by the client device based on a detection by the client device that a second view of the 3D content is to replace the first view of the 3D content, the second set of 3D blocks partitioning the 3D space, collectively enclosing at least a second portion of the 3D content in the 3D space, and each having a different combination of presentation time and presentation location in the 3D space, the second 3D block being selected by the client device based on a corresponding utility score calculated based on at least one of a bitrate of a representation of a 3D object included in the 3D content and correlated with the second 3D block by a data structure, a spatial resolution of the representation, or a temporal resolution of the representation; and providing the requested second 3D block to the client device in response to the detected second request, the client device being configured to render the second view of the 3D content in the 3D space.

A thirty-first example provides a carrier medium carrying machine-readable instructions for controlling a machine to carry out the operations (e.g., method operations) performed in any one of the previously described examples.

What is claimed is:

1. A method comprising:

detecting, by one or more processors of a machine, that a first view of a three-dimensional (3D) object in a 3D space is to be replaced with a second view of the 3D object in the 3D space;

accessing, by one or more processors of the machine, a buffer that stores a first set of 3D blocks that partition the 3D space, collectively enclose at least a first portion of the 3D object, and each have a different combination of presentation time and presentation location in the 3D space, the first set of 3D blocks being requested based on the first view of the 3D object and including a first 3D block that has a first presentation time;

in response to the detecting that the second view is to replace the first view, and by one or more processors of the machine, selecting a second set of 3D blocks that partition the 3D space, collectively enclose at least a second portion of the 3D object, and each have a different combination of presentation time and presentation location in the 3D space, the second set of 3D blocks being selected based on the second view of the 3D object and including a selected second 3D block that has a second presentation time prior to the first presentation time of the first 3D block;

requesting and receiving, by one or more processors of the machine, the selected second 3D block from a provider of the 3D object, the received and selected second 3D block being inserted non-sequentially into the buffer that already stores the first 3D block; and based on the second presentation time of the selected second 3D block, and by one or more processors of the machine, providing the selected second 3D block from the buffer to a rendering engine configured to render the second view of the 3D object in the 3D space.

2. The method of claim 1, wherein:

the first view depicts the first portion of the 3D object, the first portion being visible within a first viewing frustum;

the second view depicts the second portion of the 3D object, the second portion being visible within a second viewing frustum; and the first and second viewing frustums differ in at least one of viewing direction relative to the 3D object or viewing position relative to the 3D object.

3. The method of claim 1, wherein:

the 3D object includes a voxelized 3D point cloud enclosed by a 3D bounding volume in the 3D space;

the first set of 3D blocks occupies at least a first portion of the 3D bounding volume, the first set of 3D blocks being renderable during a first time span that includes their corresponding presentation times and renderable within a first viewing frustum that includes their corresponding presentation locations; and the second set of 3D blocks occupies at least a second portion of the 3D bounding volume, the second set of 3D blocks being renderable during a second time span that includes their corresponding presentation times and renderable within a second viewing frustum that includes their corresponding presentation locations.

4. The method of claim 1, wherein:

the selecting of the second set of 3D blocks includes:
accessing a manifest that describes multiple representations of the 3D object, the multiple representations differing in visual quality at which the 3D object is to be rendered;
selecting a representation of the 3D object among the multiple representations of the 3D object, the manifest correlating the selected representation of the 3D object with the second 3D block; and
selecting the second 3D block based on its correlation with the selected representation of the 3D object.

5. The method of claim 4, wherein:

the manifest indicates that the multiple representations of the 3D object differ from each other in at least one of bitrates, spatial resolutions, or temporal resolutions; and the selecting of the representation among the multiple representations is based on at least one of a bitrate of the representation, a spatial resolution of the representation, or a temporal resolution of the representation.

6. The method of claim 1, wherein:

the selecting of the second set of 3D blocks includes:
accessing an index that indicates at least one of a presentation location of the second 3D block or a normal vector of the second 3D block; and
selecting the second 3D block based on at least one of its presentation location or its normal vector.

7. The method of claim 1, wherein:

the selecting of the second set of 3D blocks includes:
calculating a utility score of the second 3D block; and
selecting the second 3D block based on its calculated utility score.

8. The method of claim 7, wherein:

the selecting of the second set of 3D blocks includes:
accessing a manifest that correlates a representation of the 3D object with at least one of a bitrate of the representation, a spatial resolution of the representation, or a temporal resolution of the representation, the manifest further correlating the representation with the second 3D block; and
the calculating of the utility score of the second 3D block is based on at least one of the bitrate of the representation correlated with the second 3D block, the spatial resolution of the representation correlated with the second 3D block, or the temporal resolution of the representation correlated with the second 3D block.

9. The method of claim 7, wherein:

the selecting of the second set of 3D blocks includes:
calculating a visibility score of the second 3D block based on at least one of an occlusion analysis of the second view of the 3D object, a viewing direction of the second view of the 3D object, or a viewing position of the second view of the 3D object; and
the calculating of the utility score of the second 3D block is based on the calculated visibility score.

10. The method of claim 7, wherein:

the selecting of the second set of 3D blocks includes:
determining whether the second 3D block is coincident in presentation time and presentation location to a third 3D block already stored in the buffer; and
the calculating of the utility score of the second 3D block is based on whether the second 3D block is coincident in presentation time and presentation location to the third 3D block already stored in the buffer.

11. A method comprising:
providing, by one or more processors of a machine, a first set of three-dimensional (3D) blocks that partition a 3D space, collectively enclose at least a first portion of a 3D object in the 3D space, and each have a different combination of presentation time and presentation location in the 3D space, the providing of the first set of 3D blocks being to a client device and in response to at least one first request resultant from selection of the first set of 3D blocks by the client device based on a first view of the 3D object, the first set of 3D blocks including a first 3D block that has a first presentation time;

detecting, by one or more processors of the machine, a second request for a second 3D block that has a second presentation time prior to the first presentation time of the first 3D block, the second request being resultant from selection of a second set of 3D blocks by the client device based on a detection by the client device that a second view of the 3D object is to replace the first view of the 3D object, the second set of 3D blocks partitioning the 3D space, collectively enclosing at least a second portion of the 3D object in the 3D space, and each having a different combination of presentation time and presentation location in the 3D space; and providing, in response to the detected second request and by one or more processors of the machine, the requested second 3D block non-sequentially to the client device after provision of the first 3D block to the client device.

12. The method of claim 11, wherein:
the first view depicts the first portion of the 3D object, the first portion being visible within a first viewing frustum;
the second view depicts the second portion of the 3D object, the second portion being visible within a second viewing frustum; and
the first and second viewing frustums differ in at least one of viewing direction relative to the 3D object or viewing position relative to the 3D object.

13. The method of claim 11, wherein:
the 3D object includes a voxelized 3D point cloud enclosed by a 3D bounding volume in the 3D space;
the first set of 3D blocks occupies at least a first portion of the 3D bounding volume, the first subset of 3D blocks being renderable during a first time span that includes their corresponding presentation times and renderable within a first viewing frustum that includes their corresponding presentation locations; and
the second set of 3D blocks occupies at least a second portion of the 3D bounding volume, the second subset of 3D blocks being renderable during a second time span that includes their corresponding presentation times and renderable within a second viewing frustum that includes their corresponding presentation locations.

14. A non-transitory machine-readable storage medium comprising instructions that, when executed by one or more processors of a machine, cause the machine to perform operations comprising:
detecting that a first view of a three-dimensional (3D) object in a 3D space is to be replaced with a second view of the 3D object in the 3D space;
accessing a buffer that stores a first set of 3D blocks that partition the 3D space, collectively enclose at least a first portion of the 3D object, and each have a different combination of presentation time and presentation location in the 3D space, the first set of 3D blocks being requested based on the first view of the 3D object and including a first 3D block that has a first presentation time;

in response to the detecting that the second view is to replace the first view, selecting a second set of 3D blocks that partition the 3D space, collectively enclose at least a second portion of the 3D object, and each have a different combination of presentation time and presentation location in the 3D space, the second set of 3D blocks being selected based on the second view of the 3D object and including a selected second 3D block that has a second presentation time prior to the first presentation time of the first 3D block;

requesting and receiving the second 3D block from a provider of the 3D object, the received and selected second 3D block being inserted non-sequentially into the buffer that already stores the first 3D block; and based on the second presentation time of the selected second 3D block, providing the selected second 3D block from the buffer to a rendering engine configured to render the second view of the 3D object in the 3D space.

15. A non-transitory machine-readable storage medium comprising instructions that, when executed by one or more processors of a machine, cause the machine to perform operations comprising:
providing a first set of three-dimensional (3D) blocks that partition a 3D space, collectively enclose at least a first portion of a 3D object in the 3D space, and each have a different combination of presentation time and presentation location in the 3D space, the providing of the first set of 3D blocks being to a client device and in response to at least one first request resultant from selection of the first set of 3D blocks by the client device based on a first view of the 3D object, the first set of 3D blocks including a first 3D block that has a first presentation time;

detecting a second request for a second 3D block that has a second presentation time prior to the first presentation time of the first 3D block, the second request being resultant from selection of a second set of 3D blocks by the client device based on a detection by the client device that a second view of the 3D object is to replace the first view of the 3D object, the second set of 3D blocks partitioning the 3D space, collectively enclosing at least a second portion of the 3D object in the 3D space, and each having a different combination of presentation time and presentation location in the 3D space; and providing, in response to the detected second request, the requested second 3D block non-sequentially to the client device after provision of the first 3D block to the client device.

16. A system comprising:
one or more processors; and
a memory storing instructions that, when executed by at least one processor among the one or more processors, cause the system to perform operations comprising:
detecting that a first view of a three-dimensional (3D) object in a 3D space is to be replaced with a second view of the 3D object in the 3D space;
accessing a buffer that stores a first set of 3D blocks that partition the 3D space, collectively enclose at least a first portion of the 3D object, and each have a different combination of presentation time and presentation location in the 3D space, the first set of 3D blocks being requested based on the first view of the 3D object and including a first 3D block that has a first presentation time;

in response to the detecting that the second view is to replace the first view, selecting a second set of 3D blocks that partition the 3D space, collectively enclose at least a second portion of the 3D object, and each have a different combination of presentation time and presentation location in the 3D space, the second set of 3D blocks being selected based on the second view of the 3D object and including a selected second 3D block that has a second presentation time prior to the first presentation time of the first 3D block;

requesting and receiving the selected second 3D block from a provider of the 3D object, the received and selected second 3D block being inserted non-sequentially into the buffer that already stores the first 3D block; and based on the second presentation time of the selected second 3D block, providing the selected second 3D block from the buffer to a rendering engine configured to render the second view of the 3D object in the 3D space.

17. A system comprising:

one or more processors; and a memory storing instructions that, when executed by at least one processor among the one or more processors, cause the system to perform operations comprising:

providing a first set of three-dimensional (3D) blocks that partition a 3D space, collectively enclose at least a first portion of a 3D object in the 3D space, and each have a different combination of presentation time and presentation location in the 3D space, the providing of the first set of 3D blocks being to a client device and in response to at least one first request resultant from selection of the first set of 3D blocks by the client device based on a first view of the 3D object, the first set of 3D blocks including a first 3D block that has a first presentation time;

detecting a second request for a second 3D block that has a second presentation time prior to the first presentation time of the first 3D block, the second request being resultant from selection of a second set of 3D blocks by the client device based on a detection by the client device that a second view of the 3D object is to replace the first view of the 3D object, the second set of 3D blocks partitioning the 3D space, collectively enclosing at least a second portion of the 3D object in the 3D space, and each having a different combination of presentation time and presentation location in the 3D space; and providing, in response to the detected second request, the requested second 3D block non-sequentially to the client device after provision of the first 3D block to the client device.

18. A method comprising:

detecting, by one or more processors of a machine, that a first view of a three-dimensional (3D) object in a 3D space is to be replaced with a second view of the 3D object in the 3D space;

accessing, by one or more processors of the machine, a data structure that correlates a representation of a 3D object included in the 3D object with at least one of a bitrate of the representation, a spatial resolution of the representation, or a temporal resolution of the representation, the data structure further correlating the representation with a 3D block that encloses at least part of the 3D object;

in response to the detecting that the second view is to replace the first view and by one or more processors of the machine, selecting a set of 3D blocks that partition the 3D space, collectively enclose at least a portion of the 3D object, and each have a different combination of presentation time and presentation location in the 3D space, the selecting of the set of 3D blocks being based on the second view of the 3D object and including:

calculating a utility score of the 3D block correlated to the representation based on at least one of the bitrate of the representation correlated with the 3D block, the spatial resolution of the representation correlated with the 3D block, or the temporal resolution of the representation correlated with the 3D block; and selecting the 3D block correlated to the representation for inclusion in the set of 3D blocks based on its calculated utility score;

requesting and receiving, by one or more processors of the machine, the selected 3D block correlated to the representation from a provider of the 3D object; and providing, by one or more processors of the machine, the received and selected 3D block correlated to the representation to a rendering engine configured to render the second view of the 3D object in the 3D space.

19. The method of claim 18, wherein:

the first view depicts a first portion of the 3D object, the first portion being visible within a first viewing frustum;

the second view depicts a second portion of the 3D object, the second portion being visible within a second viewing frustum; and the first and second viewing frustums differ in at least one of viewing direction relative to the 3D object or viewing position relative to the 3D object.

20. The method of claim 18, wherein:

the 3D object includes a voxelized 3D point cloud enclosed by a 3D bounding volume in the 3D space; and the selected set of 3D blocks occupies at least a portion of the 3D bounding volume, the selected set of 3D blocks being renderable during a time span that includes their corresponding presentation times and renderable within a viewing frustum that includes their corresponding presentation locations.

21. The method of claim 18, wherein:

the selecting of the set of 3D blocks includes:

accessing an index that indicates at least one of a presentation location of the 3D block correlated to the representation or a normal vector of the 3D block correlated to the representation; and selecting the 3D block correlated to the representation based on at least one of its presentation location or its normal vector.

22. The method of claim 18, wherein:

the selecting of the set of 3D blocks includes:

calculating a visibility score of the 3D block correlated to the representation based on at least one of an occlusion analysis of the second view of the 3D object, a viewing direction of the second view of the 3D object, or a viewing position of the second view of the 3D object; and the calculating of the utility score of the 3D block correlated to the representation is based on the calculated visibility score.

23. The method of claim 18, wherein:
the requested and received 3D block correlated to the representation is a second 3D block included in a second set of 3D blocks that partition the 3D space, collectively enclose at least a second portion of the 3D object, and each have a different combination of presentation time and presentation location in the 3D space, the second set of 3D blocks being selected based on the second view of the 3D object, the second 3D block having a second presentation time; and
the method further comprises:
inserting the second 3D block non-sequentially into a buffer that already stores a first set of 3D blocks that partition the 3D space, collectively enclose at least a first portion of the 3D object, and each have a different combination of presentation time and presentation location in the 3D space, the first set of 3D blocks being requested based on the first view of the 3D object and including a first 3D block that has a first presentation time subsequent to the second presentation time of the second 3D block.

24. The method of claim 23, wherein:
the selecting of the second set of 3D blocks includes:
determining whether the second 3D block is coincident in presentation time and presentation location to a third 3D block already stored in the buffer; and
the calculating of the utility score of the second 3D block is based on whether the second 3D block is coincident in presentation time and presentation location to the third 3D block already stored in the buffer.

25. A method comprising:
providing, by one or more processors of a machine, a first set of three-dimensional (3D) blocks that partition a 3D space, collectively enclose at least a first portion of a 3D object in the 3D space, and each have a different combination of presentation time and presentation location in the 3D space, the providing of the first set of 3D blocks being to a client device and in response to at least one first request resultant from selection of the first set of 3D blocks by the client device based on a first view of the 3D object;
detecting, by one or more processors of the machine, a second request for a second 3D block, the second request being resultant from selection of a second set of 3D blocks by the client device based on a detection by the client device that a second view of the 3D object is to replace the first view of the 3D object, the second set of 3D blocks partitioning the 3D space, collectively enclosing at least a second portion of the 3D object in the 3D space, and each having a different combination of presentation time and presentation location in the 3D space, the second 3D block being selected by the client device based on a corresponding utility score calculated based on at least one of a bitrate of a representation of a 3D object included in the 3D object and correlated with the second 3D block by a data structure, a spatial resolution of the representation, or a temporal resolution of the representation; and
providing, by one or more processors of the machine, the requested second 3D block to the client device in response to the detected second request, the client device being configured to render the second view of the 3D object in the 3D space.

26. The method of claim 25, wherein:
the 3D object includes a voxelized 3D point cloud enclosed by a 3D bounding volume in the 3D space; the first set of 3D blocks occupies at least a first portion of the 3D bounding volume, the first set of 3D blocks being renderable during a first time span that includes their corresponding presentation times and renderable within a first viewing frustum that includes their corresponding presentation locations; and
the second set of 3D blocks occupies at least a second portion of the 3D bounding volume, the second set of 3D blocks being renderable during a second time span that includes their corresponding presentation times and renderable within a second viewing frustum that includes their corresponding presentation locations.

27. A non-transitory machine-readable storage medium comprising instructions that, when executed by one or more processors of a machine, cause the machine to perform operations comprising:
detecting that a first view of a three-dimensional (3D) object in a 3D space is to be replaced with a second view of the 3D object in the 3D space;
accessing a data structure that correlates a representation of a 3D object included in the 3D object with at least one of a bitrate of the representation, a spatial resolution of the representation, or a temporal resolution of the representation, the data structure further correlating the representation with a 3D block that encloses at least part of the 3D object;
in response to the detecting that the second view is to replace the first view, selecting a set of 3D blocks that partition the 3D space, collectively enclose at least a portion of the 3D object, and each have a different combination of presentation time and presentation location in the 3D space, the selecting of the set of 3D blocks being based on the second view of the 3D object and including:
calculating a utility score of the 3D block based on at least one of the bitrate of the representation correlated with the 3D block, the spatial resolution of the representation correlated with the 3D block, or the temporal resolution of the representation correlated with the 3D block; and
selecting the 3D block for inclusion in the set of 3D blocks based on its calculated utility score;
requesting and receiving the selected 3D block from a provider of the 3D object; and
providing the 3D block to a rendering engine configured to render the second view of the 3D object in the 3D space.

28. A non-transitory machine-readable storage medium comprising instructions that, when executed by one or more processors of a machine, cause the machine to perform operations comprising:
providing a first set of three-dimensional (3D) blocks that partition a 3D space, collectively enclose at least a first portion of a 3D object in the 3D space, and each have a different combination of presentation time and presentation location in the 3D space, the providing of the first set of 3D blocks being to a client device and in response to at least one first request resultant from selection of the first set of 3D blocks by the client device based on a first view of the 3D object;
detecting a second request for a second 3D block, the second request being resultant from selection of a second set of 3D blocks by the client device based on a detection by the client device that a second view of the 3D object is to replace the first view of the 3D object, the second set of 3D blocks partitioning the 3D space, collectively enclosing at least a second portion of the 3D object in the 3D space, and each having a different combination of presentation time and presentation location in the 3D space, the second 3D block being selected by the client device based on a corresponding utility score calculated based on at least one of a bitrate of a representation of the 3D object and correlated with the second 3D block by a data structure, a spatial resolution of the representation, or a temporal resolution of the representation; and providing the requested second 3D block to the client device in response to the detected second request, the client device being configured to render the second view of the 3D object in the 3D space.

29. A system comprising:

one or more processors; and a memory storing instructions that, when executed by at least one processor among the one or more processors, cause the system to perform operations comprising:

detecting that a first view of a three-dimensional (3D) object in a 3D space is to be replaced with a second view of the 3D object in the 3D space;

accessing a data structure that correlates a representation of the 3D object with at least one of a bitrate of the representation, a spatial resolution of the representation, or a temporal resolution of the representation, the data structure further correlating the representation with a 3D block that encloses at least part of the 3D object;

in response to the detecting that the second view is to replace the first view, selecting a set of 3D blocks that partition the 3D space, collectively enclose at least a portion of the 3D object, and each have a different combination of presentation time and presentation location in the 3D space, the selecting of the set of 3D blocks being based on the second view of the 3D object and including:

calculating a utility score of the 3D block based on at least one of the bitrate of the representation correlated with the 3D block, the spatial resolution of the representation correlated with the 3D block, or the temporal resolution of the representation correlated with the 3D block; and selecting the 3D block for inclusion in the set of 3D blocks based on its calculated utility score;

requesting and receiving the selected 3D block from a provider of the 3D object; and providing the 3D block to a rendering engine configured to render the second view of the 3D object in the 3D space.

30. A system comprising:

one or more processors; and a memory storing instructions that, when executed by at least one processor among the one or more processors, cause the system to perform operations comprising:

providing a first set of three-dimensional (3D) blocks that partition a 3D space, collectively enclose at least a first portion of a 3D object in the 3D space, and each have a different combination of presentation time and presentation location in the 3D space, the providing of the first set of 3D blocks being to a client device and in response to at least one first request resultant from selection of the first set of 3D blocks by the client device based on a first view of the 3D object;

detecting a second request for a second 3D block, the second request being resultant from selection of a second set of 3D blocks by the client device based on a detection by the client device that a second view of the 3D object is to replace the first view of the 3D object, the second set of 3D blocks partitioning the 3D space, collectively enclosing at least a second portion of the 3D object in the 3D space, and each having a different combination of presentation time and presentation location in the 3D space, the second 3D block being selected by the client device based on a corresponding utility score calculated based on at least one of a bitrate of a representation of a 3D object included in the 3D object and correlated with the second 3D block by a data structure, a spatial resolution of the representation, or a temporal resolution of the representation; and providing the requested second 3D block to the client device in response to the detected second request, the client device being configured to render the second view of the 3D object in the 3D space.

* * * * *

UNITED STATES PATENT AND TRADEMARK OFFICE
CERTIFICATE OF CORRECTION

PATENT NO. : 10,834,391 B2
APPLICATION NO. : 15/960085
DATED : November 10, 2020
INVENTOR(S) : Chou et al.

Page 1 of 2

It is certified that error appears in the above-identified patent and that said Letters Patent is hereby corrected as shown below:

In the Specification

In Column 9, Line 18, delete "managed" and insert --manager-- therefor

In Column 11, Lines 15-16, delete "ObjectName_$bandwidth$_$width$_framerate$_$number$.hvr" and insert --ObjectName_$bandwidth$_$width$_$framerate$_$number$.hvr-- therefor In Column 11, Lines 19-20, delete "$Sframerate$" and insert --$framerate$-- therefor In Column 11, Line 33, delete "$Sframerate$." and insert --$framerate$.-- therefor In Column 14, Line 59, delete "R," and insert --$R_i$-- therefor In Column 14, Line 65, delete "$\mathcal{N} = \{tile, n\}$" and insert --$\mathcal{N} = \{tile, n\}$-- therefor In Column 14, Line 67, before "list", insert --is the--

In Column 15, Lines 11-13, delete "$R(\mathcal{M}) = \sum_{tile \in \mathcal{N} \text{ and } tile \in tile.n} tile \cdot bit[tile, m] \leq R_i$" and insert --$R(\mathcal{M}) = \sum_{tile \in \mathcal{N} \text{ and } tile \in tile.n} tile \cdot bitCount[tile, m] \leq R_i$-- therefor In Column 30, Line 17, delete "α" and insert --a-- therefor In Column 32, Line 20, delete "time:" and insert --time;-- therefor Signed and Sealed this
Thirtieth Day of March, 2021

Drew Hirshfeld
*Performing the Functions and Duties of the
Under Secretary of Commerce for Intellectual Property and
Director of the United States Patent and Trademark Office*

In the Claims

In Column 45, Lines 64-65, in Claim 18, after "representation of", delete "a 3D object included in"

In Column 48, Line 21, in Claim 27, after "of", delete "a 3D object included in"